(12) United States Patent
Hazard et al.

(10) Patent No.: US 11,494,669 B2
(45) Date of Patent: *Nov. 8, 2022

(54) CLUSTERING, EXPLAINABILITY, AND AUTOMATED DECISIONS IN COMPUTER-BASED REASONING SYSTEMS

(71) Applicant: Diveplane Corporation, Raleigh, NC (US)

(72) Inventors: Christopher James Hazard, Raleigh, NC (US); Christopher Fusting, Raleigh, NC (US); Michael Resnick, Raleigh, NC (US)

(73) Assignee: Diveplane Corporation, Raleigh, NC (US)

( * ) Notice: Subject to any disclaimer, the term of this patent is extended or adjusted under 35 U.S.C. 154(b) by 364 days.

This patent is subject to a terminal disclaimer.

(21) Appl. No.: 16/660,352

(22) Filed: Oct. 22, 2019

(65) Prior Publication Data

US 2020/0134484 A1 Apr. 30, 2020

Related U.S. Application Data

(63) Continuation-in-part of application No. 16/205,413, filed on Nov. 30, 2018, which is a continuation of (Continued)

(51) Int. Cl.
*G06N 5/04* (2006.01)

(52) U.S. Cl.
CPC ..................... *G06N 5/04* (2013.01)

(58) Field of Classification Search
CPC ............ G06N 5/02; G06N 5/04; G06N 20/00; G06N 7/005; G06N 5/045; G06N 3/02;
(Continued)

(56) References Cited

U.S. PATENT DOCUMENTS 4,935,877 A 6/1990 Koza
5,581,664 A 12/1996 Allen et al.
(Continued)

FOREIGN PATENT DOCUMENTS

WO WO2017057528 4/2017
WO WO2017189859 11/2017

OTHER PUBLICATIONS

Perner P. "Why Case-Based Reasoning is Attractive for Image Interpretation", Springer Verlag, 2001. (Previously supplied). (Year: 2001).*

(Continued)

*Primary Examiner* — Dave Misir
(74) *Attorney, Agent, or Firm* — Dority & Manning, P.A.

(57) ABSTRACT

The techniques herein include using an input context to determine a suggested action and/or cluster. Explanations may also be determined and returned along with the suggested action. The explanations may include (i) one or more most similar cases to the suggested case (e.g., the case associated with the suggested action) and, optionally, a conviction score for each nearby cases; (ii) action probabilities, (iii) excluding cases and distances, (iv) archetype and/or counterfactual cases for the suggested action; (v) feature residuals; (vi) regional model complexity; (vii) fractional dimensionality; (viii) prediction conviction; (ix) feature prediction contribution; and/or other measures such as the ones discussed herein, including certainty. The explanation data may be used to determine whether to perform a suggested action.

13 Claims, 4 Drawing Sheets

Related U.S. Application Data application No. 16/205,394, filed on Nov. 30, 2018, which is a continuation of application No. 16/205,373, filed on Nov. 30, 2018, now Pat. No. 10,528,877.

(60) Provisional application No. 62/760,805, filed on Nov. 13, 2018, provisional application No. 62/760,696, filed on Nov. 13, 2018, provisional application No. 62/752,857, filed on Oct. 30, 2018.

(58) Field of Classification Search
CPC .. G05D 1/0088; G05D 1/0221; G05D 1/0061; G05D 2201/0213; G06K 9/6277
USPC ................................ 706/46, 47; 382/155
See application file for complete search history.

(56) References Cited

U.S. PATENT DOCUMENTS

| | | | |
|---|---|---|---|
| 6,282,527 | B1 | 8/2001 | Gounares et al. |
| 6,741,972 | B1 | 5/2004 | Girardi et al. |
| 7,499,896 | B2 | 3/2009 | Horvitz |
| 7,873,587 | B2 | 1/2011 | Baum |
| 9,239,989 | B2 | 1/2016 | Bouqata et al. |
| 9,299,025 | B1 * | 3/2016 | Rubin ............... G06N 5/025 |
| 9,330,358 | B1 * | 5/2016 | Rubin ............... G06N 5/022 |
| 9,489,635 | B1 | 11/2016 | Zhu |
| 9,922,286 | B1 * | 3/2018 | Hazard ............. G06N 5/025 |
| 10,459,444 | B1 | 10/2019 | Kentley-Klay |
| 2001/0049595 | A1 | 12/2001 | Plumer et al. |
| 2004/0019851 | A1 | 1/2004 | Purvis et al. |
| 2005/0137992 | A1 | 6/2005 | Polak |
| 2006/0195204 | A1 | 8/2006 | Bonabeau et al. |
| 2008/0153098 | A1 | 6/2008 | Rimm et al. |
| 2008/0307399 | A1 | 12/2008 | Zhou et al. |
| 2009/0006299 | A1 | 1/2009 | Baum |
| 2009/0144704 | A1 | 6/2009 | Niggemann et al. |
| 2010/0106603 | A1 | 4/2010 | Dey et al. |
| 2010/0287507 | A1 | 11/2010 | Paquette et al. |
| 2011/0060895 | A1 | 3/2011 | Solomon |
| 2011/0161264 | A1 | 6/2011 | Cantin |
| 2011/0225564 | A1 | 9/2011 | Biswas et al. |
| 2012/0323618 | A1 * | 12/2012 | Allgaier ............ G06Q 10/10 705/7.11 |
| 2013/0006901 | A1 | 1/2013 | Cantin |
| 2013/0262504 | A1 * | 10/2013 | Allgaier ............ G06N 5/04 707/769 |
| 2013/0339365 | A1 | 12/2013 | Balasubramanian et al. |
| 2014/0052680 | A1 * | 2/2014 | Nitz ................. G06N 5/04 706/46 |
| 2015/0112917 | A1 * | 4/2015 | Lorentzen ......... G06Q 30/0201 706/47 |
| 2015/0127583 | A1 * | 5/2015 | Allgaier ............ G06N 5/04 706/11 |
| 2016/0055427 | A1 | 2/2016 | Adjaoute |
| 2017/0010106 | A1 | 1/2017 | Shashua et al. |
| 2017/0012772 | A1 | 1/2017 | Mueller |
| 2017/0053211 | A1 | 2/2017 | Heo et al. |
| 2017/0091645 | A1 | 3/2017 | Matus |
| 2017/0161640 | A1 | 6/2017 | Shamir |
| 2017/0236060 | A1 | 8/2017 | Ignatyev |
| 2018/0072323 | A1 | 3/2018 | Gordon et al. |
| 2018/0089563 | A1 | 3/2018 | Redding et al. |
| 2018/0235649 | A1 | 8/2018 | Elkadi |
| 2018/0336018 | A1 | 11/2018 | Lu et al. |
| 2019/0147331 | A1 | 5/2019 | Arditi |
| 2020/0118011 | A1 * | 4/2020 | Kaiser ............... H04L 67/10 |

OTHER PUBLICATIONS

Aamodt A. "Explanation-Driven Case-Based Reasoning", Topics in case-based reasoning. Springer Verlag, 1994, pp. 274-288. (Previously supplied). (Year: 1994).*

McSherry D. "Interactive Case-Based Reasoning in Sequential Diagnosis", Applied Intelligence 14, 65-76, 2001. (Previously supplied). (Year: 2001).*

Allgaier et al., "Semantic-Based Case Retrieval of Service Integration Models in Extensible Enterprise Systems Based on a Business Domain Ontology", CAiSE 2011 Workshops, LNBIP 83, pp. 414-424, 2011. (Previously supplied). (Year: 2011).*

Allgaier et al., "Towards a Model-based Service Integration Framework for Extensible Enterprise Systems", MKWI 2010—Enterprise Resource Planning und Transformation von ERP-Systemen 1523. (Previously supplied). (Year: 2010).*

Hinkle et al., "Applying Case-Based Reasoning to Manufacturing", AI Magazine vol. 16 No. 1, 1995. (Previously supplied). (Year: 1995).*

Salamo, "Adaptive case-based reasoning using retention and forgetting strategies", Knowledge-Based Systems 24 (2011) 230-247. (Previously supplied). (Year: 2011).*

Smyth, "Case-Base Maintenance", 1998. (Previously supplied). (Year: 1998).*

Campillo-Gimenez, "Improving Case-Based Reasoning Systems by Combining K-Nearest Neighbour Algorithm with Logistic Regression in the Prediction of Patients' Registration on the Renal Transplant Waiting List", PLOS ONE, Sep. 2013, vol. 8, Issue 9. (Previously supplied). (Year: 2013).*

Cheetham, "Case-Based Reasoning with Confidence", 12th European Conference on Computer Vision, vol. 1898, Jan. 1, 2000, Berlin, Heidelberg, pp. 15-25.

International Preliminary Report on Patentability for Application No. PCT/US2019/058046, dated May 14, 2021, 10 pages.

Abramson, "The Expected-Outcome Model of Two-Player Games", PhD Thesis, Columbia University, New York, New York, 1987, 125 pages.

Abuelaish et al., "Analysis and Modelling of Groundwater Salinity Dynamics in the Gaza Strip", Cuadernos Geograficos, vol. 57, Issue 2, pp. 72-91.

Agarwal et al., "Nearest-Neighbor Searching Under Uncertainty II", ACM Transactions on Algorithms, vol. 13, Issue 1, Article 3, 2016, 25 pages.

Aggarwal et al., "On the Surprising Behavior of Distance Metrics in High Dimensional Space", International Conference on Database Theory, London, United Kingdom, Jan. 4-6, 2001, pp. 420-434.

Akaike, "Information Theory and an Extension of the Maximum Likelihood Principle", Proceedings of the $2^{nd}$ International Symposium on Information Theory, Sep. 2-8, 1971, Tsahkadsor, Armenia, pp. 267-281.

Alpaydin, "Machine Learning: The New AI", MIT Press, Cambridge, Massachusetts, 2016, 225 pages.

Alpaydin, "Voting Over Multiple Condensed Nearest Neighbor", Artificial Intelligence Review, vol. 11, 1997, pp. 115-132.

Altman, "An Introduction to Kernel and Nearest-Neighbor Nonparametric Regression", The American Statistician, vol. 46, Issue 3, 1992, pp. 175-185.

Archer et al., "Empirical Characterization of Random Forest Variable Importance Measures", Computational Statistics & Data Analysis, vol. 52, 2008, pp. 2249-2260.

Beyer et al., "When is 'Nearest Neighbor' Meaningful?" International Conference on Database Theory, Springer, Jan. 10-12, 1999, Jerusalem, Israel, pp. 217-235.

Cano et al., "Evolutionary Stratified Training Set Selection for Extracting Classification Rules with Tradeoff Precision-Interpretability" Data and Knowledge Engineering, vol. 60, 2007, pp. 90-108.

Chomboon et al., An Empirical Study of Distance Metrics for k-Nearest Neighbor Algorithm, $3^{rd}$ International Conference on Industrial Application Engineering, Kitakyushu, Japan, Mar. 28-31, 2015, pp. 280-285.

Dwork et al., "The Algorithmic Foundations of Differential Privacy", Foundations and Trends in Theoretical Computer Science, vol. 9, Nos. 3-4, 2014, pp. 211-407.

Efros et al., "Texture Synthesis by Non-Parametric Sampling", International Conference on Computer Vision, Sep. 20-25, 1999, Corfu, Greece, 6 pages.

(56) References Cited

OTHER PUBLICATIONS

Gao et al., "Efficient Estimation of Mutual Information for Strongly Dependent Variables", 18$^{th}$ International Conference on Artificial Intelligence and Statistics, San Diego, California, May 9-12, 2015, pp. 277-286.
Gehr et al., "AI$^2$: Safety and Robustness Certification of Neural Networks with Abstract Interpretation", 39$^{th}$ IEEE Symposium on Security and Privacy, San Francisco, California, May 21-23, 2018, 16 pages.
Gemmeke et al., "Using Sparse Representations for Missing Data Imputation in Noise Robust Speech Recognition", European Signal Processing Conference, Lausanne, Switzerland, Aug. 25-29, 2008, 5 pages.
Goodfellow et al., "Deep Learning", 2016, 800 pages.
Google AI Blog, "The What-If Tool: Code-Free Probing of Machine Learning Models", Sep. 11, 2018, https://pair-code,github.io/what-if-tool, retrieved on Mar. 14, 2019, 5 pages.
Gottlieb et al., "Near-Optimal Sample Compression for Nearest Neighbors", Advances in Neural Information Processing Systems, Montreal, Canada, Dec. 8-13, 2014, 9 pages.
Hastie et al., "The Elements of Statistical Learning", 2001, 764 pages.
Hinneburg et al., "What is the Nearest Neighbor in High Dimensional Spaces?", 26$^{th}$ International Conference on Very Large Databases, Cairo, Egypt, Sep. 10-14, 2000, pp. 506-515.
Hmeidi et al., "Performance of KNN and SVM Classifiers on Full Word Arabic Articles", Advanced Engineering Informatics, vol. 22, Issue 1, 2008, pp. 106-111.
Houle et al., "Can Shared-Neighbor Distances Defeat the Curse of Dimensionality?", International Conference on Scientific and Statistical Database Management, Heidelberg, Germany, Jun. 31-Jul. 2, 2010, 18 pages.
Indyk et al., "Approximate Nearest Neighbors: Towards Removing the Curse of Dimensionality", Procedures of the 30$^{th}$ ACM Symposium on Theory of Computing, Dallas, Texas, May 23-26, 1998, pp. 604-613.
Kittler, "Feature Selection and Extraction", Handbook of Pattern Recognition and Image Processing, Jan. 1986, Chapter 3, pp. 115-132.
Kohavi et al., "Wrappers for Feature Subset Selection", Artificial Intelligence, vol. 97, Issues 1-2, Dec. 1997, pp. 273-323.
Kontorovich et al., "Nearest-Neighbor Sample Compression: Efficiency, Consistency, Infinite Dimensions", Advances in Neural Information Processing Systems, 2017, pp. 1573-1583.
Kulkarni et al., "Hierarchical Deep Reinforcement Learning: Integrating Temporal Abstraction and Intrinsic Motivation", arXiv:1604.06057v2, May 31, 2016, 14 pages.
Kuramochi et al., "Gene Classification using Expression Profiles: A Feasibility Study", Technical Report TR 01-029, Department of Computer Science and Engineering, University of Minnesota, Jul. 23, 2001, 18 pages.
Leinster et al., "Maximizing Diversity in Biology and Beyond", Entropy, vol. 18, Issue 3, 2016, 23 pages.
Liao et al., "Similarity Measures for Retrieval in Case-Based Reasoning Systems", Applied Artificial Intelligence, vol. 12, 1998, pp. 267-288.
Lin et al., "Why Does Deep and Cheap Learning Work So Well?" Journal of Statistical Physics, vol. 168, 2017, pp. 1223-1247.
Lukaszyk, "Probability Metric, Examples of Approximation Applications in Experimental Mechanics", PhD Thesis, Cracow University of Technology, 2003, 149 pages.
Lukaszyk, "A New Concept of Probability Metric and its Applications in Approximation of Scattered Data Sets", Computational Mechanics, vol. 33, 2004, pp. 299-304.
Mann et al., "On a Test of Whether One or Two Random Variables is Stochastically Larger than the Other", The Annals of Mathematical Statistics, 1947, pp. 50-60.
Martino et al., "A Fast Universal Self-Tuned Sampler within Gibbs Sampling", Digital Signal Processing, vol. 47, 2015, pp. 68-83.

Mohri et al., Foundations of Machine Learning, 2012, 427 pages—uploaded as Part 1 and Part 2.
Olson et al., "PMLB: A Large Benchmark Suite for Machine Learning Evaluation and Comparison", arXiv:1703.00512v1, Mar. 1, 2017, 14 pages.
Pedregosa et al., "Machine Learning in Python", Journal of Machine Learning Research, vol. 12, 2011, pp. 2825-2830.
Phan et al., "Adaptive Laplace Mechanism: Differential Privacy Preservation in Deep Learning" 2017 IEEE International Conference on Data Mining, New Orleans, Louisiana, Nov. 18-21, 2017, 10 pages.
Poerner et al., "Evaluating Neural Network Explanation Methods Using Hybrid Documents and Morphosyntactic Agreement", Proceedings of the 56$^{th}$ Annual Meeting of the Association for Computational Linguistics (Long Papers), Melbourne, Australia, Jul. 15-20, 2018, pp. 340-350.
Raikwal et al., "Performance Evaluation of SVM and K-Nearest Neighbor Algorithm Over Medical Data Set", International Journal of Computer Applications, vol. 50, No. 14, Jul. 2012, pp. 975-985.
Rao et al., "Cumulative Residual Entropy: A New Measure of Information", IEEE Transactions on Information Theory, vol. 50, Issue 6, 2004, pp. 1220-1228.
Ribeiro et al., "'Why Should I Trust You': Explaining the Predictions of Any Classifier", arXiv:1602.04938v3, Aug. 9, 2016, 10 pages.
Schaul et al., "Universal Value Function Approximators", International Conference on Machine Learning, Lille, France, Jul. 6-11, 2015, 9 pages.
Schuh et al., "Mitigating the Curse of Dimensionality for Exact KNN Retrieval", Proceedings of the 26$^{th}$ International Florida Artificial Intelligence Research Society Conference, St. Pete Beach, Florida, May 22-24, 2014, pp. 363-368.
Schuh et al., "Improving the Performance of High-Dimensional KNN Retrieval Through Localized Dataspace Segmentation and Hybrid Indexing", Proceedings of the 17$^{th}$ East European Conference, Advances in Databases and Information Services, Genoa, Italy, Sep. 2013, pp. 344-357.
Schwarz et al., "Estimating the Dimension of a Model", The Annals of Statistics, vol. 6, Issue 2, Mar. 1978, pp. 461-464.
Silver et al., "Mastering the Game of Go Without Human Knowledge", Nature, vol. 550, Oct. 19, 2017, pp. 354-359.
Skapura, "Building Neural Networks", 1996, p. 63.
Stephenson et al., "A Continuous Information Gain Measure to Find the Most Discriminatory Problems for AI Benchmarking", arxiv.org, arxiv.org/abs/1809.02904v2, retrieved on Aug. 21, 2019, 8 pages.
Stoppiglia et al., "Ranking a Random Feature for Variable and Feature Selection" Journal of Machine Learning Research, vol. 3, 2003, pp. 1399-1414.
Surya et al., "Distance and Similarity Measures Effect on the Performance of K-Nearest Neighbor Classifier", arXiv:1708.04321v1, Aug. 14, 2017, 50 pages.
Tan et al., "Incomplete Multi-View Weak-Label Learning", 27$^{th}$ International Joint Conference on Artificial Intelligence, 2018, pp. 2703-2709.
Tao et al., "Quality and Efficiency in High Dimensional Nearest Neighbor Search", Proceedings of the 2009 ACM SIGMOD International Conference on Management of Data, Providence, Rhode Island, Jun. 29-Jul. 2, 2009, pp. 563-576.
Tishby et al., "Deep Learning and the Information Bottleneck Principle", arXiv:1503.02406v1, Mar. 9, 2015, 5 pages.
Tockar, "Differential Privacy: The Basics", Sep. 8, 2014, https://research.neustar.biz/2014/09/08/differential-privacy-the-basics/ retrieved on Apr. 1, 2019, 3 pages.
Tomasev et al., "Hubness-aware Shared Neighbor Distances for High-Dimensional k-Nearest Neighbor Classification", 7$^{th}$ international Conference on Hybrid Artificial Intelligent Systems, Salamanca, Spain, Mar. 28-30, 2012, 38 pages.
Trautmann et al., "On the Distribution of the Desirability Index using Harrington's Desirability Function", Metrika, vol. 63, Issue 2, Apr. 2006, pp. 207-213.

(56) References Cited

OTHER PUBLICATIONS

Triguero et al., "Self-Labeled Techniques for Semi-Supervised Learning: Taxonomy, Software and Empirical Study", Knowledge and Information Systems, vol. 42, Issue 2, 2015, pp. 245-284.

Tuomisto, "A Consistent Terminology for Quantifying Species Diversity? Yes, It Does Exist" Oecologia, vol. 164, 2010, pp. 853-860.

Vacek et al., "Using Case-Based Reasoning for Autonomous Vehicle Guidance", International Conference on Intelligent Robots and Systems, San Diego, California, Oct. 29-Nov. 2, 2007, 5 pages.

Verleysen et al., "The Curse of Dimensionality in Data Mining and Time Series Prediction" International Work-Conference on Artificial Neural Networks, Barcelona, Spain, Jun. 8-10, 2005, pp. 758-770.

Wachter et al., "Counterfactual Explanations Without Opening the Black Box: Automated Decisions and the GDPR", Harvard Journal of Law and Technology, vol. 31, No. 2, Spring 2018, 47 pages.

Wang et al., "Falling Rule Lists" 18$^{th}$ International Conference on Artificial Intelligence and Statistics, San Diego, California, May 9-12, 2015, 10 pages.

Xu et al., "An Algorithm for Remote Sensing Image Classification Based on Artificial Immune B-Cell Network", The International Archives of the Photogrammetry, Remote Sensing and Spatial Information Sciences, vol. XXXVII, Part 86b, Beijing China, Jul. 3-11, 2008, 6 pages.

Zhao et al., "Semi-Supervised Multi-Label Learning with Incomplete Labels", 24$^{th}$ International Joint Conference on Artificial Intelligence, Buenos Aires, Argentina, Jul. 25-31, 2015, pp. 4062-4068.

Abdi, "Cardinality Optimization Problems", The University of Birmingham, PhD Dissertation, May 2013, 197 pages.

Aboulnaga, "Generating Synthetic Complex-structured XML Data", Proceedings of the Fourth International Workshop on the Web and Databases, WebDB 2001, Santa Barbara, California, USA, May 24-25, 2001, 6 pages.

Alhaija, "Augmented Reality Meets Computer Vision: Efficient Data Generation for Urban Driving Scenes", arXiv:1708.01566v1, Aug. 4, 2017, 12 pages.

Anderson, "Synthetic data generation for the internet of things," 2014 IEEE International Conference on Big Data (Big Data), Washington DC, 2014, pp. 171-176.

Bull, Haploid-Diploid Evolutionary Algorithms: The Baldwin Effect and Recombination Nature's Way, Artificial Intelligence and Simulation of Behaviour Convention, Apr. 19-21, 2017, Bath, United Kingdom, pp. 91-94.

Chawla, "SMOTE: Synthetic Minority Over-sampling Technique", arXiv:1106.1813v1, Jun. 9, 2011, 37 pages.

Chen, "DropoutSeer: Visualizing Learning Patterns in Massive Open Online Courses for Dropout Reasoning and Prediction", 2016 IEEE Conference on Visual Analytics Science and Technology (VAST), Oct. 23-28, 2016, Baltimore, Maryland, USA, 10 pages.

Colakoglu, "A Generalization of the Minkowski Distance and a New Definition of the Ellipse", arXiv:1903.09657v1, Mar. 2, 2019, 18 pages.

Dernoncourt, "MoocViz: A Large Scale, Open Access, Collaborative, Data Analytics Platform for MOOCs". NIPS 2013 Education Workshop. Nov. 1, 2013, Lake Tahoe, Utah, USA, 8 pages.

Ding, "Generating Synthetic Data for Neural Keyword-to-Question Models", arXiv:1807.05324v1, Jul. 18, 2018, 12 pages.

Fathony, "Discrete Wasserstein Generative Adversarial Networks (DWGAN)", OpenReview.net, Feb. 18, 2018, 20 pages.

Ganegedara et al., "Self Organizing Map Based Region of Interest Labelling for Automated Defect Identification in Large Sewer Pipe Image Collections", IEEE World Congress on Computational Intelligence, Jun. 10-15, 2012, Brisbane, Australia, 8 pages.

Ghosh, "Inferential Privacy Guarantees for Differentially Private Mechanisms", arXiv:1603:.01508v1, Mar. 4, 2016, 31 pages.

Gray, "Quickly Generating Billion-Record Synthetic Databases", SIGMOD '94: Proceedings of the 1994 ACM SIGMOD international conference on Management of data, May 1994, Minneapolis, Minnesota, USA, 29 pages.

Hazard et al, "Natively Interpretable Machine Learning and Artificial Intelligence: Preliminary Results and Future Directions", arXiv:1901v1, Jan. 2, 2019, 15 pages.

Hoag "A Parallel General-Purpose Synthetic Data Generator", ACM SIGMOID Record, vol. 6, Issue 1, Mar. 2007, 6 pages.

Imbalanced-learn, "SMOTE", 2016-2017, https://imbalanced-learn.readthedocs.io/en/stable/generated/imblearn.over_sampling.SMOTE.html, retrieved on Aug. 11, 2020, 6 pages.

International Search Report and Written Opinion for PCT/US2018/047118, dated Dec. 3, 2018, 9 pages.

International Search Report and Written Opinion for PCT/US2019/026502, dated Jul. 24, 2019, 16 pages.

International Search Report and Written Opinion for PCT/US2019/066321, dated Mar. 19, 2020, 17 pages.

Internet Archive, "System Verilog distribution Constraint—Verification Guide", Aug. 6, 2018, http://web.archive.org/web/20180806225430/https://www.verificationguide.com/p/systemverilog-distribution-constraint.html, retrieved on Mar. 3, 2020, 4 pages.

Internet Archive, "SystemVerilog Testbench Automation Tutorial", Nov. 17, 2016, https://web.archive.org/web/20161117153225/http://www.doulos.com/knowhow/sysverilog/tutorial/constraints/, retrieved on Mar. 3, 2020, 6 pages.

Kushilevitz et al., "Efficient Search for Approximate Nearest Neighbor in High Dimensional Spaces", Society for Industrial and Applied Mathematics Journal Computing, vol. 30, No. 2, pp. 457-474.

Lin, "Development of a Synthetic Data Set Generator for Building and Testing Information Discovery Systems", Proceedings of the Third International Conference on Information Technology: New Generations, Nevada, USA, Apr. 10-12, 2016, Las Vegas, Nevada, USA, 6 pages.

Montanez, "SDV: An Open Source Library for Synthetic Data Generation", Massachusetts Institute of Technology, Master's Thesis, Sep. 2018, 105 pages.

Negra, "Model of a Synthetic Wind Speed Time Series Generator", Wind Energy, Wiley Interscience, Sep. 6, 2007, 17 pages.

Nguyen et al., "NP-Hardness of $\ell_0$ Minimization Problems: Revision and Extension to the Non-Negative Setting", 13th International Conference on Sampling Theory and Applications, Jul. 8-12, 2019, Bordeaux, France, 4 pages.

Patki, "The Synthetic Data Vault: Generative Modeling for Relational Databases", Massachusetts Institute of Technology, Master's Thesis, Jun. 2016, 80 pages.

Patki, "The Synthetic Data Vault", 2016 IEEE International Conference on Data Science and Advanced Analytics (DSAA), Oct. 17-19, 2016, Montreal, QC, pp. 399-410.

Pei, "A Synthetic Data Generator for Clustering and Outlier Analysis", The University of Alberta, 2006, 33 pages.

Prakosa "Generation of Synthetic but Visually Realistic Time Series of Cardiac Images Combining a Biophysical Model and Clinical Images" IEEE Transactions on Medical Imaging, vol. 32, No. 1, Jan. 2013, pp. 99-109.

Priyardarshini, "WEDAGEN: A synthetic web database generator", International Workshop of Internet Data Management (IDM'99), Sep. 2, 1999, Florence, IT, 24 pages.

Pudjijono, "Accurate Synthetic Generation of Realistic Personal Information" Advances in Knowledge Discovery and Data Mining, Pacific-Asia Conference on Knowledge Discovery and Data Mining, Apr. 27-30, 2009, Bangkok, Thailand, 12 pages.

Reiter, "Using CART to Generate Partially Synthetic Public Use Microdata" Journal of Official Statistics, vol. 21, No. 3, 2005, pp. 441-462.

Rosenberg et al., "Semi-Supervised Self-Training of Object Detection Models", IEEE Workshop on Applications of Computer Vision, 2005, 9 pages.

Schlabach et al., "FOX-GA: A Genetic Algorithm for Generating and ANalayzing Battlefield COurses of Action", 1999 MIT.

Schreck, "Towards an Automatic Predictive Question Formulation", Massachusetts Institute of Technology, Master's Thesis, Jun. 2016, 121 pages.

(56) References Cited

OTHER PUBLICATIONS

Schreck, "What would a data scientist ask? Automatically formulating and solving prediction problems", 2016 IEEE International Conference on Data Science and Advanced Analytics (DSAA), Oct. 17-19, 2016, Montreal, QC, pp. 440-451.
Smith, "FeatureHub: Towards collaborative data science", 2017 IEEE International Conference on Data Science and Advanced Analytics (DSAA), Oct. 19-21, 2017, Tokyo, pp. 590-600.
Sun et al., "Fuzzy Modeling Employing Fuzzy Polyploidy Genetic Algorithms", Journal of Information Science and Engineering, Mar. 2002, vol. 18, No. 2, pp. 163-186.
Sun, "Learning Vine Copula Models for Synthetic Data Generation", arXiv:1812.01226v1, Dec. 4, 2018, 9 pages.
Tran, "Dist-GAN: An Improved GAN Using Distance Constraints", arXiv:1803.08887V3, Dec. 15, 2018, 20 pages.
Viera, "Generating Synthetic Sequential Data using GANs", Medium: Toward AI, Jun. 29, 2020, 31 pages.
Wei et al., "An Operation-Time Simulation Framework for UAV Swarm Configuration and Mission Planning", 2013.
Weselkowski et al., "TraDE: Training Device Selection via Multi-Objective Optimization", IEEE 2014.
Wu, "The Synthetic Student: A Machine Learning Model to Simulate MOOC Data", Massachusetts Institute of Technology, Master's Thesis, May 2015, 103 pages.
Xiao, "Towards Automatically Linking Data Elements", Massachusetts Institute of Technology, Master's Thesis, Jun. 2017, 92 pages.

\* cited by examiner

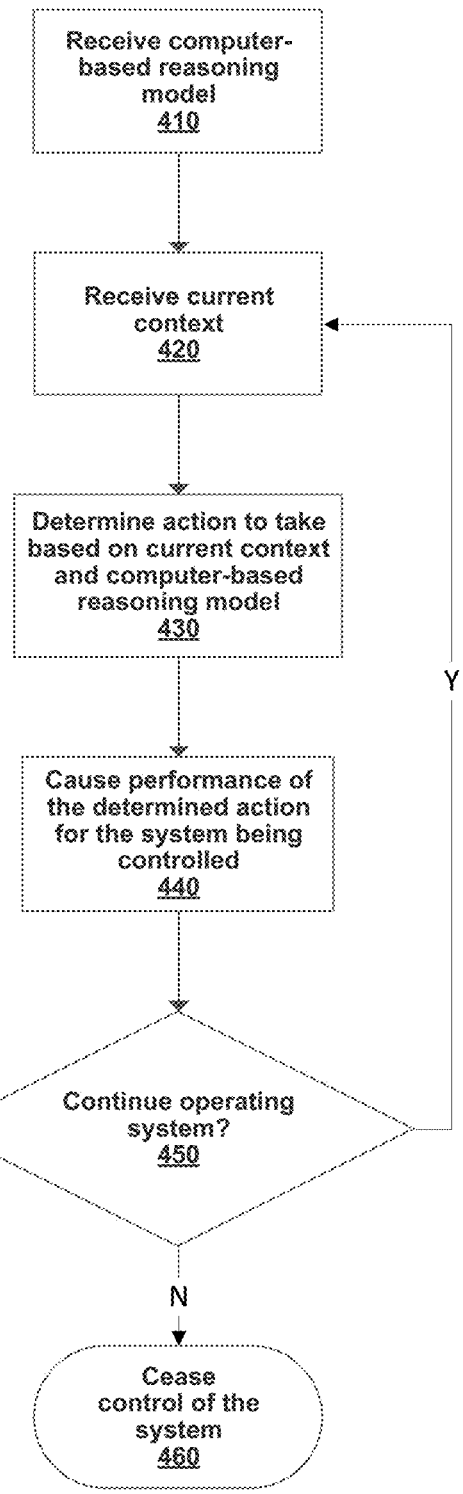

US 11,494,669 B2

CLUSTERING, EXPLAINABILITY, AND AUTOMATED DECISIONS IN COMPUTER-BASED REASONING SYSTEMS

PRIORITY CLAIM

The present application is a continuation-in-part of U.S. application Ser. No. 16/205,413 having a filing date of Nov. 30, 2018, which is a continuation of U.S. application Ser. No. 16/205,394 having a filing date of Nov. 30, 2018, which is a continuation of U.S. application Ser. No. 16/205,373 having a filing date of Nov. 30, 2018. The present application also claims the benefit of U.S. Provisional Application No. 62/760,696 filed Nov. 13, 2018, U.S. Provisional Application No. 62/760,805 filed Nov. 13, 2018, and U.S. Provisional Application No. 62/752,857 filed Oct. 30, 2018. Applicant claims priority to and the benefit of each of the applications identified in this paragraph and incorporates all such applications herein by reference in their entirety.

FIELD OF THE INVENTION

The present invention relates to computer-based reasoning systems and more specifically to explainability and decisions in computer-based reasoning systems.

BACKGROUND

Machine learning systems can be used to predict outcomes based on input data. For example, given a set of input data, a regression-based machine learning system can predict an outcome. The regression-based machine learning system will likely have been trained on much training data in order to generate its regression model. It will then predict the outcome based on the regression model.

One issue with current systems is, however, that those predicted outcomes appear without any indication of why a particular outcome has been predicted. For example, a regression-based machine learning system will simply output a predicted result, and provide no indication of why that outcome was predicted. When machine learning systems are used as decision-making systems, this lack of visibility into why the machine learning system has made its decisions can be an issue. For example, when the machine learning system makes a prediction, which is then used as part of a decision, that decision is made without knowing why the machine learning system predicted that particular outcome based on the input. When the prediction or subsequent decision is wrong, there is no way to trace back and assess why the prediction was made by the machine learning system.

The techniques herein overcome these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The claims provide a summary of the invention.

BRIEF DESCRIPTION OF THE DRAWINGS

In the drawings:

FIG. 4 is a flow diagram depicting example processes for controlling systems.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The techniques herein provide for explainable and automated decisions in computer-based reasoning systems. In some embodiments, the computer-based reasoning is a case-based reasoning system. In case-based reasoning systems, in some embodiments, an input context may be used to determine a suggested action. The input context may have multiple features and those features may be used to find the "most similar" case or cases in the case-based reasoning model. "Similarity" may be determined using a premetric, as discussed elsewhere herein. In some embodiments, a single most similar case, multiple similar cases, or a combination of multiple similar cases can be returned as a suggested action or actions.

In addition to the suggested action, explanation data may also be determined and returned with the suggested action. The explanation data may include, in some embodiments, a certainty score, such as a conviction score for the suggested action. The certainty score may be determined in numerous ways, such as those discussed herein. The explanation data may also (or instead) include (i) one or more most similar cases to the suggested case (e.g., the case associated with the suggested action) and, optionally, a conviction score for each nearby cases; (ii) action probabilities, (iii) excluding cases and distances, (iv) archetype and/or counterfactual cases for the suggested action; (v) feature residuals; (vi) regional model complexity; (vii) fractional dimensionality; (viii) prediction conviction; (ix) feature prediction contribution; and/or other measures such as the ones discussed herein. In some embodiments, the explanation data may be used to determine whether to perform a suggested action.

Figure 1:
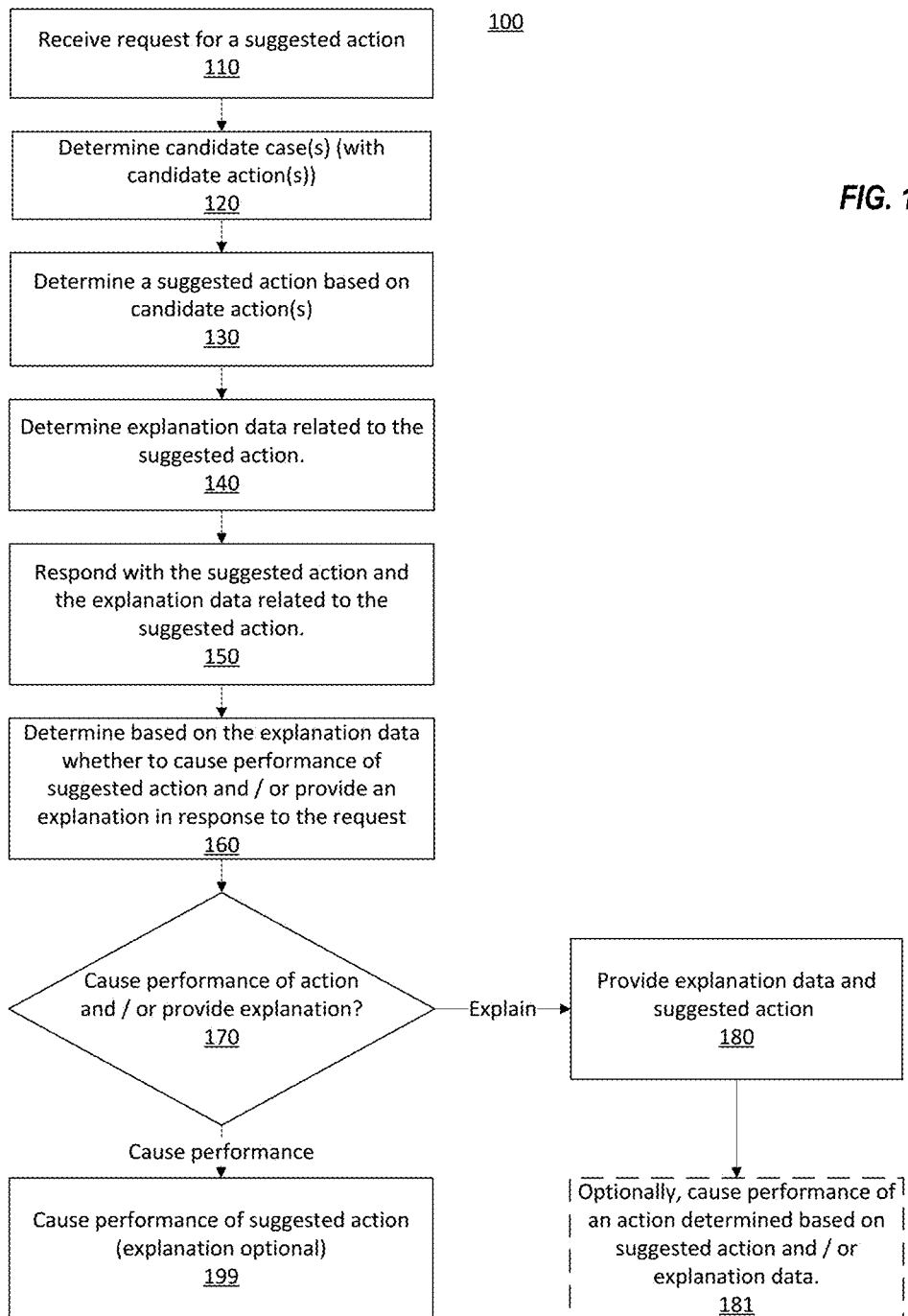
FIG. 1 is a flow diagram depicting example processes for explainable and automated decisions in computer-based reasoning systems.

Example Process for Explainable and Automated Decision Making in Computer-Based Reasoning Systems FIG. 1 is a flow diagram depicting an example process for explainable and automated decisions in computer-based and case-based reasoning systems. Generally, process 100 begins by receiving 110 a request for a suggested action. Numerous examples of requests for suggested action are described herein. After the request for a suggested action has been received 110, a determination 120 is made for one or more suggested cases. The request for a suggested action received 110 may include an input context that can be used to determine 120 one or more suggested cases (e.g., for use in control of a system). Each of the one or more suggested cases may be associated with an action. As such, determining 120 one or more suggested cases may also include determining 120 one or more suggested actions to be taken. A machine learning systems might simply stop at 120 and provide the one or more suggested actions (e.g., for control of a system). Techniques herein, however, include determining 130 a suggested action and determining 140 explanation data related to the suggested action. For example, after determining 120 suggested cases, which includes suggested actions, a suggested action may be determined based on the one or more suggested actions. Determining 130 a suggested action may be accomplished by any of the techniques described herein, including combining the suggested actions together to form a new suggested action, picking one of the suggested actions to be the suggested action, and the like. After determining 130 a suggested action based on the one or more suggested actions, explanation data may be determined 140. Explanation data may take many forms, including conviction scores, certainty measures, similarity measures, prototype identity, distance measures, such as distance to the nearest contrary case, and the like. After determining 140 the explanation data and determining 130 the suggested action, a response 150 may be sent with the suggested action and the explanation.

A determination 160 may be made based on the explanation data whether to cause the performance of the suggested action and/or provide an explanation in response to the request. If the determination 160 made on the explanation data indicates 170 that performance should be caused, then performance of the suggested action is caused 199. Causing performance of the suggested action may include controlling a real world system, such as a self-driving car or any of the other examples discussed herein. If the determination 160 does not indicate 170 performance of the suggested action, then the explanation data may be provided 180 along with the suggested action related to the explanation data. In some embodiments, the suggested action may still be performed, a different action may be performed, or not action may be performed as part of performing 181.

Conviction Examples

Returning to the top of process 100, a request may be received 110 for a suggested action to be taken. Receiving 110 the request for a suggested action may take many forms, such as an API call, a remote procedure call, activating a motor or other actuator, setting a voltage, receiving digital information via http, https, ftp, ftps, and/or the like. The format of the request may be any appropriate format, including an indicator that an action is being requested, and the context in which the action is being requested.

After an input context is received 110, a case-based reasoning system may be queried based on the provided context as part of the request in order to determine 120 one or more candidate cases. In some embodiments, determining 120 the one or more candidate cases may include comparing the input context in the received 110 request to the elements in a case-based reasoning model. In some embodiments, this received 110 context is called the input context, or the current context. In some embodiments, the input context is compared to cases in the case-based reasoning model. The cases that are most similar to the input context, may be used as the candidate cases. In some embodiments, the number of candidate cases to determine may be any appropriate number including 1, 2, 5, 10, etc. The number of candidate cases may also be a function of the number of cases in the model (e.g., a percentage of the model). In some embodiments, the candidate cases may be determined as those within a certain threshold distance of the input context (e.g., as measured by a distance measure or other premetric, such as those discussed herein).

In some embodiments, determining 120 one or more candidate cases based on the input context may include determining a region around the input context and determining the most similar one or more cases that are outside of that region. For example, the cases that are within a region may be those cases that are within a certain distance (for example, using one of the distance measures discussed herein). The region may be defined, in some embodiments, as the most similar N cases, the most similar P percent of the model. In some embodiments, the region may be also based on a density measure. In some embodiments, the region may be defined as a function of density. For example, the density of cases around the input context may be above a certain threshold density and as you move away from the input context, the density of cases may drop, and upon dropping that may define the boundary of that region. Once that region around the input context is determined, then the one or more candidate cases are determined 120 as those most similar to the input context while being outside the region.

If only a single candidate action is determined 120, then that candidate action may be determined 130 as the suggested action. If multiple candidate actions are determined 120, then any appropriate technique can be used to determine 130 the suggested action based on those two or more candidate actions. For example, if the candidate cases all have the same candidate actions, then that (identical among the candidate cases) candidate action may be used as a suggested action. If the candidate actions in the candidate cases previously determined 120 are different, then another mechanism may be used, such as voting among the candidate actions, taking the candidate action that appears most often, determining an arithmetic mean or mode of the candidate actions, harmonic mean, inverse distance weighted mean (e.g., where the weights are based on distance of the related context to the input context, based on conviction, etc.), Lukaszyk-Karmowski metric weighted mean, kernel methods, fisher kernels, radial basis function, and/or the like. In some embodiments, determining the suggested action may include choosing based on the candidate cases and action using feature weights. The feature weights may be chosen based on conviction of the features, or any other appropriate mechanism. Further, the candidate actions in the candidate cases previously determined 120 may be used to determine if any action is taken, for example, the action may not be taken unless all of the candidate actions are equal, within some threshold of each other (e.g., as measured by distance or similarity), meet the criteria of a diversity or variance measure, if any action values in the candidate set are equal to specific values, if any action values in the candidate set are outside of specified bounds, etc. For example, in some embodiments, determining 130 a suggested action based on the respective one or more candidate actions includes determining a weighting for each action of the respective one or more candidate actions based on a function of a distance between the input context and each of the one or more candidate cases. The suggested action may then be determined 130 based on the weighting of each action of the respective one or more candidate actions. The weighting for each candidate action may be, as noted above, based on the distance between that candidate action and the input context. Any appropriate distance metric or pre-metric may be used, including Euclidean distance, Minkowski distance, Damerau-Levenshtein distance, Kullback-Leibler divergence, 1-Kronecker delta, and/or any other distance measure, metric, pseudometric, premetric, index, and the like.

Explanation data is determined 140 related to the suggested action. For example, in some embodiments, a certainty score may be determined 140 for the suggested action. In some embodiments, determining the certainty score for the suggested action may be accomplished by removing the suggested case from the case-based reasoning model and determining a conviction measure associated with adding the suggested case back into the case-based reasoning model. Numerous examples of certainty measures and conviction functions are discussed elsewhere herein. In some embodiments, as depicted in FIG. 1, the suggested action may be determined 130 before the explanation data is determined 140. Embodiments also include determining 130 and 140 the suggested action and the explanation data simultaneously or determining 140 the explanation data before determining 130 the suggested action.

After the certainty score has been determined 140, the suggested action and the certainty score may be sent in response 150 to the original request for a suggest action. When the certainty score is determined 160 as being beyond a certain threshold, a decision 170 is made to cause 199 control of a system based on the suggested action. For example, if the certainty score is above a certain threshold, then a controlled system may be confident that the suggested action should be performed without further review or explanation. As such, when that certainty score is above that threshold, the control of the system may be caused 199 based on that suggested action. Controlling a system based on suggested action is explained in detail elsewhere herein. As one example, if a certainty score for a suggested action for a self-driving car is above a certain threshold, then that action may be performed for the self-driving car.

When the certainty score for a suggested action is determined 160 to not be beyond a certain threshold, then a decision 170 is made to determine and provide 180 one or more explanation factors for the suggested action. For example, the explanation factors may include the certainty score. In some embodiments, additional explanation factors, such as those discussed herein, may be determined and provided 180. Further, when the certainty score is not beyond a certain threshold, the one or more explanation factors may be provided 180 in response to the original request for a suggested action, to the original requestor (in addition to or instead of the suggested action). For example, if the certainty score is not beyond a certain threshold, then the certainty score and the suggested action may both be provided to a human operator of the requesting system, who may then review the suggested action and the certainty score in order to determine what action to take next. As depicted in FIG. 1, the system may optionally perform 181 an action based on the suggested action and/or the explanation. For example, if a human operator of a self-driving car is provided with a suggested action for the self-driving car and the certainty score, which is below a certain threshold, that human operator may decide to continue to perform the suggested action, perform a different action, or no action at all.

Clustering Examples

In some embodiments, data may be clustered, and those clusters may be used in explanations and/or for automated or semi-automated decision making. For example, the training data in the model may be clustered, and an indication of the cluster can be added to the data elements in the model as a field or feature. Additionally, as described below, any or all of the explanation data discussed herein may be determined for the clusters and that explanation data may be included as part of the data element and/or returned when the cluster information is returned as part of a response to a query. Various embodiments use one or more clustering algorithms to cluster the training data. These may include K-means clustering, density-based scan ("DBscan"), mean shift clustering, expectation maximization clustering, agglomerative hierarchical clustering, spectral clustering, entropy-based clustering methods, and/or any other appropriate clustering algorithm.

In some embodiments, after the model is trained and the clusters (and possibly explanation data as discussed herein) are determined and stored in, for example, fields of corresponding data elements in the model, a new input context may be received 110 and, in response, an action and/or a cluster for the input context may be returned 150. For example, an input context may be received 110 and one or more candidate cases may be determined 120 (as discussed elsewhere herein), in addition to returning 150 a result or action based on the one or more candidate cases, the techniques may, in addition to an action, or instead, return 150 a cluster. In some embodiments, the cluster may be the result or action that is requested, and therefore is returned 150 as the result or action. In some embodiments, the cluster may be explanation data. Further, as described herein, in some embodiments, explanation data (such as that described herein) for the cluster can also be returned 150.

In various embodiments, various clusters and cluster types may be used. Clusters may be ordinal, nominal, cardinal, continuous, ordered lists, unordered lists, textual, cyclically ordinal or continuous, and/or any other appropriate type or label or made with any appropriate technique. For example, data for loan approvals may be clustered into groups that correspond to low risk, medium risk, high risk, and very high risk. These clusters may be an unordered list or order list (e.g., where low risk<medium risk<high risk<very high risk).

The cluster to return 150 may be determined in any appropriate manner. For example, if only a single cluster is associated with the determined 120 one or more candidate cases, then that cluster may be returned 150. If multiple clusters are associated with the determined 120 one or more candidate cases ("candidate clusters"), then any appropriate technique can be used to determine 130 or 140 the cluster based on those two or more candidate clusters. For example, if all the candidate cases have the same candidate clusters, then that candidate cluster (identical among the candidate cases) may be used as the returned 150 cluster. In some embodiments, if the candidate clusters in the one or more candidate cases differ, then another mechanism may be used, such as, as appropriate, voting among the candidate clusters, taking the candidate cluster that appears most often, determining an arithmetic mean or mode of the candidate clusters, harmonic mean, inverse distance weighted mean (e.g., where the weights are based on distance of the related context to the input context, based on conviction, etc.), Lukaszyk-Karmowski metric weighted mean, kernel methods, fisher kernels, radial basis function, and/or the like. In some embodiments, determining the cluster may include choosing based on the candidate cases and clusters using feature weights (e.g., the feature weights of the features that contribute the most to the designation of cluster). The feature weights may be chosen based on feature importance, mean decrease in accuracy, SHapley Additive exPlanations (SHAP), conviction of the features, or any other appropriate mechanism. Further, the candidate clusters in the candidate cases previously determined 120 may be used to determine if any cluster is returned 150, for example, the cluster may not be returned 150 unless all of the candidate clusters are equal, within some threshold of each other (e.g., as measured by distance or similarity), meet the criteria of a diversity or variance measure, if any cluster values in the candidate set are equal to specific values, if any cluster values in the candidate set are outside of specified bounds, etc. For example, in some embodiments, determining 130 or 140 a suggested cluster based on the respective one or more candidate clusters includes determining a weighting for each cluster of the respective one or more candidate clusters based on a function of a distance between the input context and each of the one or more candidate cases. The suggested cluster may then be determined 130 or 140 based on the weighting of each cluster of the respective one or more candidate clusters. In some embodiments, when weighting for each candidate cluster is, as noted above, based on the distance between that candidate cases and the input context, any appropriate distance metric or pre-metric may be used, including Euclidean distance, Minkowski distance, Damerau-Levenshtein distance, Kullback-Leibler divergence, 1-Kronecker delta, and/or any other distance measure, metric, pseudometric, premetric, index, and the like.

In some embodiments, in addition to or instead of a cluster being returned 150 as the suggested result or action, the explanation data determined 140 for a suggested action may be a cluster, and the cluster and the action may be returned 150. In some embodiments, a determination 160 may then be made based on the cluster and the action whether 170 to perform the suggested action, a different action, or no action at all. In some embodiments, this may be made determined based on compatibility or incompatibility. A compatibility score may represent the probability or likelihood of fit between an action and a cluster. A probability score may be related to the probabilities of possible results. A likelihood score may be a function of how plausible it is that a parameter in question is the actual parameter that underlies the data that you've already seen (e.g., data that is already in the computer-based reasoning model. In some embodiments, using conditioning and integration, probabilities may be computed from likelihood functions notwithstanding possible differences (e.g., some embodiments of likelihood functions may not have an area under the curve of one, etc.).

As a particular compatibility score example, if the returned cluster and the suggested action correspond to the same or compatible desired actions or outcomes, then that may be an indication that the action should be performed without further review, which may correspond to a positive (or high) compatibility score. As another example, if the cluster indicates a low risk loan application and the suggested action is approval of the loan, then this may correspond to a negative (or low) compatibility score, and the action may be performed (in some embodiments) without further review (approval of the loan). If, however, the cluster and the action are incompatible (negative or low compatibility score), sometimes called "conflicting", then the suggested action may be flagged for further review. For example, if the cluster is high risk application or very high risk application, and the suggested action is approval of the loan (or, e.g., if the cluster is for low risk, and the suggested action is denial of the loan), then the suggested action and suggested cluster may be determined to have a negative compatibility score. If the suggested action and suggested cluster have a negative compatibility score, then the suggested action may be flagged for review. In some embodiments, compatibility scores for suggested actions and clusters may be determined by analyzing a table, list, or database of conflicting cluster-action combination, non-conflicting cluster-action combinations, preferred or non-preferred cluster-action combinations, or the like. For example, if there is a list of non-preferred cluster-action combinations, and the determined 130 or 140 cluster and suggested action combinations is in the list of non-preferred cluster-action combinations, then a conflict between the two may be indicated by a low or negative compatibility.

Herein compatibility scores are discussed as being "positive" (or high) and "negative" (or low), and that may be the case Score could also be binary (0 or 1, true or false), integers, solely positive or negative numbers, percentages, etc. For example, a compatibility score could be based on 1 being the highest compatibility and 0.0 being the lowest compatibility, while incompatibility might be measured from 1 (or 0.0) being the most incompatible and 0.0 (or 1) being the most compatible. In some embodiments, any other appropriate scoring could be used such as incompatibility corresponding to a high or positive score and compatibility corresponding to a low or negative score. The scores themselves could be determined in any appropriate manner, such as assigning values in a lookup table or matrix, doing a sum of products of a vector that represents the values relevant to the decision, or any appropriate manner. For example, a lookup table for the example discussed related to loan approvals may appear similar to this:

| Compatibility | High risk | Medium Risk | Low Risk |
|---|---|---|---|
| Approve | 0.0 | 0.5 | 1.0 |
| Flag | 0.4 | 1.0 | 0.6 |
| Deny | 1.0 | 0.5 | 0.0 |

In the specific example above, when checking compatibility, if the compatibility score was beyond a first and/or second threshold (e.g., above 0.8 and or below 0.2), then the decision may be to automatically use the suggested action (e.g., high risk+deny; or low risk+approve). If the compatibility score is not beyond the first and/or second threshold (e.g., between 0.2 and 0.8), then the decision may be flagged for review, perhaps by sending at least the suggested action and the suggested cluster in response to the original request. In some embodiments, the compatibility score may also be sent.

In some embodiments, lack of compatibility or conflicts between a suggested action and a cluster occur because an individual data element has conflicting actions and clusters (e.g., high risk and approval of loan). Such conflicts may be detected at the time of determination 130 or 140 of suggested action, e.g., if the clusters are being made then, or after the clusters have been made, but before the determination 130 or 140 (e.g., at the time of processing the training data). In some embodiments, it may be appropriate to correct data elements where the action conflicts with the cluster. For example, upon review, it may be determined that either the action (e.g., an approval) or the cluster (e.g., high risk) is not appropriate for the data element. That data element may be modified or removed from the model. In some embodiments, however, it may be appropriate to keep data where the action conflicts with the cluster for the data element. Such data may represent circumstances where the suggested action should always be reviewed, and, therefore, when that data element supplies the suggested action and the cluster, the flagging for review is appropriate (e.g., some high risk applicants may warrant further review before deciding whether to approve or deny a loan).

In addition to a cluster and an action conflicting when they come from the same data element, the cluster and suggested action may also differ because the one or more suggested cases had at least two cases as members, and the action and cluster chosen based on those two or more suggested cases were not chosen to correspond to the suggested action, and resulted in a conflict. Such cases may be appropriate to flag for review, in some embodiments, because they represent situation in which highly related cases have differing clusters and/or associated actions.

Additionally, in some embodiments, information related to how well a cluster fits a data element may be determined in addition to the cluster to determine whether to perform the suggested action, a different action, or no action at all. For example, one or more certainty scores, such as one or more of the conviction scores discussed herein, may be determined for the "fit" of the cluster to the data element (e.g., a case associated with the suggested action). Those one or more certainty scores may be additionally added as features to the data elements. The certainty of fit of a cluster may be used as explanation data and/or as part of decision making. Various embodiments of explanation data are discussed herein and could be determined for cluster. These include action probabilities explanation data for the clusters, excluded case explanation data, counterfactual explanation data, archetype explanation data, feature residual explanation data (including a contribution by adding or removing one feature to the residuals of another feature, and also including local, regional, or global residuals), regional model complexity explanation data, fractal dimensionality explanation data, conviction ratios explanation data, prediction conviction explanation data, feature prediction conviction explanation data, feature prediction contribution explanation data, familiarity conviction explanation data, etc. For example, a certainty score, such as a conviction measure, probability, likelihood, or confidence interval, may be determined for the suggested cluster and that certain score may be used to determine whether to perform the suggested action, a different action, or no action at all. In some embodiments, the certainty score can be used instead of or in addition to the compatibility score, or the compatibility score can be determined based, at least in part, on the certainty score (e.g., a low certainty score could be used to change the compatibility score to be closer to a "flag for review" value. In the example above, that may be, e.g., if the certainty score was below a certain threshold, then the compatibility score could be the average of (0.5, compatibility score), thereby skewing the values toward the middle, or "review" range).

As a particular example, feature prediction conviction and/or feature prediction contribution may be determined 140 for the cluster. In some embodiments, as discussed more elsewhere herein, feature prediction contribution or conviction can be used to flag what features are contributing most (or above a threshold amount) to a cluster. Such information can be useful for either ensuring that certain features are not used for particular decision making and/or ensuring that certain features are used in particular clustering and/or decision making based on the cluster. If the feature prediction contribution of a prohibited feature is determined 160 to be above a certain threshold, then the suggested cluster along with explanation data for the feature prediction contribution can be provided 180 to a human operator, who may then confirm the suggested cluster, a different cluster, or no cluster at all. In some embodiments, this feature may then be dropped from the model and/or the model may be retrained with different clustering for those clusters that were determined based on flagged feature. If the feature prediction contribution for undesirable features are determined 160 to be below a certain threshold, then performance of the suggested cluster may be used automatically (e.g., as explanation data and/or as an action).

As discussed more elsewhere herein, unknown and undesirable bias may exist in a computer-based reasoning model. An example of this would be a decision-making computer-based reasoning model making a decision based on a characteristic that it should not, such deciding whether to approve a loan based on the height of an applicant. The designers, user, or other operators of a loan approval system may have flagged applicant height as a prohibited factor for decision making. If it is determined 140 that height was a factor (for example, one of more of the feature prediction contribution, feature importance, mean decrease in accuracy, SHAP, conviction of the features, etc. are beyond one or more certain thresholds) in a loan decision that was based on a cluster (e.g., approve, review, deny), that information can be provided 180 to a human operator, who may then decide to perform 181 based on the suggested cluster (e.g., approve the loan notwithstanding that it was suggested at least in part based on height), assign the applicant to a different cluster, or to no cluster at all. If the feature is not determined 140 to be a factor, then the loan may be approved (as one example) without further review based on the contribution of height to the cluster associated with the decision.

As noted above, in some embodiments, there may also be features whose contribution are desired (e.g., credit score in the case of a loan approval). In such cases, if the feature prediction contribution for a feature whose contribution is desired is determined 160 to be below a certain threshold, then the suggested cluster along with the feature prediction contribution may be provided 180 to a human operator who may then decide to perform 181 based on the suggested cluster (approve the loan notwithstanding that it was made at without contribution of the desired feature), assign to a different cluster, or to no cluster at all. If the feature prediction contribution of the desired feature is below the above threshold, then the cluster may be used to cause 199 performance (e.g., loan may be approved) without further review based on the contribution of the desired feature (e.g., credit score) to the decision.

Feature Range Examples

Returning to determining 140 explanation date, in some embodiments, determining 140 the one or more explanation factors may include determining a regional model of two or more cases in the case-based reasoning model near the suggested case (e.g., as the nearest N cases, the nearest P percent of cases, the nearest cases before a density differential, etc., as discussed elsewhere herein). In some embodiments, a regional model is called a "case region." For each feature in the input context, a determination may be made whether a value for that feature is outside the range of values for the corresponding feature in the cases in the regional model. In some embodiments, a determination can then be made whether to automatically cause 199 performance of the suggested action. The suggested action may be performed if there are no features outside the range of the corresponding features in the regional model, if there are smaller than a certain number of features outside the regional model, and/or the features do not differ by more than a threshold amount (either percentage or fixed threshold) than the range of the corresponding feature in the regional model. If the determination is made to automatically perform the suggested action, then the system may cause 199 performance of the suggested action. If the determination is made not to automatically perform the suggested action, then any input features that are outside the range of values for the corresponding features in the case of the regional models may be provided 180 as one of the one or more explanation factors. For example, if there are a number of cases around the suggested case, and the input context has one or more features outside of the range of values for that regional model that may be important for a human operator to know in order to decide whether or not to perform 181 the suggested action, a different action, or no action at all.

Action Probability Examples

In some embodiments, the one or more candidate actions include two or more candidate actions. Returning to determining 140 explanation data, in some embodiments, action probabilities for each of the two or more candidate actions may be determined 140. In some embodiments, the candidate actions are categorical, and the action probabilities are categorical action probabilities of each action in the set of two or more candidate actions can be determined. For example, if all of the candidate actions are the same action (e.g., Action A), then the categorical action probability of Action A is 100% because all of candidate actions are Action A. In some embodiments, if the candidate actions differ, then the categorical action probabilities may be determined based on the number of times that each action appears in the candidate actions. For example, if there are nine suggested actions and those actions are (A, B, C, A, B, B, A, A, A) then the categorical action probability for Action A would be (#of A/#total)=55.6% (rounded), for Action B would be (#of B/#total)=1/3 or 33%, and for Action C would be (#of C/#total)=11.1% (rounded). In some embodiments, determining a categorical action probability may also or instead be a function of the distance of each suggested action to the input context. Using the same example, but shown as a tuple of candidate action and distance, those actions may be (A 1.1; B 1.2; C 1.2; A 1.4; B 1.5; B 1.6; A 1.4; A 1.4; A 1.9). In some embodiments, the equation used to determine the weighted categorical action probability may be, for each candidate action category, the sum of the inverse of the distances for that categorical action probability divided by the sum of the inverse of all distances. In the example, the categorical action probabilities would be, for Action A, (1/1.1+1/1.4+1/1.4+1/1.4+1/1.9)/(1/1.1+1/1.2+1/1.2+1/1.4+1/1.5+1/1.6+1/1.4+1/1.4+1/1.9) or approximately 54.7%, for Action B (1/1.2+1/1.5+1/1.6)/(1/1.1+1/1.2+1/1.2+1/1.4+1/1.5+1/1.6+1/1.4+1/1.4+1/1.9) or approximately 32.5%, and for Action C (1/1.2)/(1/1.1+1/1.2+1/1.2+1/1.4+1/1.5+1/1.6+1/1.4+1/1.4+1/1.9) or approximately 12.7%.

In some embodiments, the action may include continuous or ordinal (e.g., non-categorical, and/or not a nominal or ordinal) values and the action probability for each value is determined based on the confidence interval of the suggested actions for a given tolerance. For example, the action probability of an action value of 250 may have a 67% probability of being within +/−5 of 250. For actions that include multiple values, the probability may be given per pair of value and tolerance or as the probability of all of the values being within of all of the tolerances.

These action probabilities may be provided in response 150 to the request for a suggested action. Further, the action probability for the suggested action may be compared to a threshold. When the action probability for the suggested action is beyond that certain threshold (e.g., above 25%, 50%, 90%, etc.), control of a system may be caused 199 based on the suggested action. For example, if the action probability of the suggested action is high, then a system may be confident that performing the suggested action without further review is proper. On the other hand, if the action probability of the suggested action is low, then performing the suggested action may not necessarily be proper. As such, when the action probability is not beyond the certain threshold, then one or more explanation factors for the suggested action may be determined and provided 180 in response to the suggested action. These may be in addition to or instead of other explanation factors discussed else herein. Further, the action probabilities comparison to the threshold may be performed along with, in addition to, or instead of, other comparisons or controls discussed herein. For example, a decision to cause 199 the performance of the suggested action may be made based on both or either the certainty score being above a first threshold and/or the action probability of the suggested action being above a second threshold.

Excluding Cases Examples

Returning to determining 120 the one or more candidate cases, in some embodiments, cases within a certain range of the input context may be determined and excluded from the candidate cases, as discussed elsewhere herein (e.g., those cases within a certain distance of the input context, the most similar N cases, the most similar cases that are P percent of the model, or those chosen for exclusion based on a density calculation). Then those cases most similar to the input context, outside of the excluded cases, may be used as the candidate cases. Then, in some embodiments, a distance measure from the input context to the one or more candidate cases may be determined 140. When that distance measure from the input context to the one or more candidate cases is within a certain threshold, control of a system may automatically be caused 199 (as discussed elsewhere herein). For example, when, notwithstanding that certain more similar cases have been excluded, the next most similar case is still within a certain threshold, then the system may be confident in performing the suggested action. When the distance from the input context to the one or more candidate cases is beyond the certain threshold, however, then one or more explanation factors may be determined and provided 180 in response to the request for the suggested action. For example, when the distance to the candidate cases, having excluded the more similar cases, is beyond the certain threshold, then explanation factors may be determined and provided 180 in response to the request for a suggested action. The explanation factors may include the distance(s) calculated, the candidate cases, and the like. In providing these explanation factors, a human operator may be able to review that the candidate cases were beyond a certain threshold. This may be useful information for the human operator to review in order to determine whether to perform the suggested action, perform a different action, or perform no action at all.

Counterfactual Examples

Returning to determining 140 explanation data for the suggested action, in some embodiments, one or more counterfactual cases may be determined 140 based on the suggested action and the input context. In some embodiments, determining 140 the counterfactual cases may include, for actions which are ordinals or nominals, determining 140, as the counterfactual cases, one or more cases with actions different from the suggested case that are most similar to the input context (e.g., based on a distance measure between contexts or contexts & action(s), such as those discussed herein). For example, if the suggested action is for a self-driving car to turn left (as opposed to other actions, like "continue straight", "turn right", etc.), and the most similar case with a different suggested action, for example, stay in the same lane, is determined, then that case may be the counterfactual case. In some embodiments, more than one counterfactual case may be determined.

In some embodiments, more than one counterfactual case may be determined. For example, the most similar few cases with the same counterfactual action may be determined. Additionally, in some embodiments, the most similar case with each of multiple different actions may be determined. For example, returning to the self-driving car example, the most similar case that would "continue straight" may be determined, as well as the most similar case that would "turn right" could be determined as the two or more counterfactual cases.

In some embodiments, determining the one or more counterfactual cases, such as for actions that are continuous variables, may include determining one or more cases that maximize a ratio of a function of the distance to the suggested action space and a function of the distance to the input context in the context space. Specific examples of functions may include, in some embodiments, the counterfactual case(s) may be the ones that maximize the (distance in action space from the suggested action to the counterfactual action)/(distance in context space from the suggested case's context); (distance in action space–suggested to counterfactual)/(distance in action+context space–suggested to counterfactual); a logistic function based on the aforementioned action distance to context distance or action and context distance to context distance; and the like.

Further, the distance from the input context of the one or more counterfactual cases may be determined 140. If there is a single counterfactual case determining the distance to the counterfactual case using one of the distance measures or pre-metrics discussed herein. If there are two or more counterfactual cases, then the distance of each of those to the input context may be determined and used as an aggregate distance for comparison to a threshold. For example, the maximum of the two distances, the minimum of the two or more distances, the average of the two or more distances, or the like may be used. After determining 140 the one or more counterfactual cases and distance measures associated with those cases, those counterfactual cases and distances may be returned in response 150 to the request for a suggested action along with the suggested action, and any other explanation data, such as that discussed herein. When the distance from the input context to the one or more counterfactual cases is determined 160 to be beyond a certain threshold, the system may cause 199 control of a real-world system based on the suggested action. For example, if counterfactual cases are distant (e.g., beyond a certain threshold), then a system may be confident in performing the suggested action. When the distance from the input context to the one or more counterfactual cases is below a certain threshold, however, one or more explanation factors may be determined and provided 180 in response to the request for a suggested action. For example, the explanation factors may include the distance determined, and/or the one or more counterfactual cases.

Archetype Examples

Returning to determining 140 explanation data, in some embodiments, determining 140 explanation data may include determining 140 one or more archetype cases based on the suggested action. Determining 140 an archetype case may include determining a first set of cases with identical actions to the suggested action and a second set of cases with different actions from the suggested action. Then determining the one or more archetype cases as the first set of cases that are farthest from the set of cases in the second set of cases. For example, if there are 10 cases with the same action as the suggested action and there are 100 cases with a different action than the suggested action, then the case in the first set with the identical actions that is farthest from all of the cases in the second set, or the case that is the centermost among its similar cases, may be used as the archetype. Determining an archetype in this way may be useful because it will find a case that may be least likely to have an incorrect action based on input context.

The one or more archetype cases may be sent in response 150 to the request for a suggested action. Further, a distance may be determined between the archetype case and the input context. Any appropriate distance measure, including those discussed herein may be used to determine the distance between the archetype case and the input context. When this distance is within a certain threshold, the control of a system may be caused 199 based on the suggested action. For example, if the input context is near the archetype, a system may be confident in performing the suggested action because of the similarity of the suggested action and the archetype. As noted elsewhere herein, this comparison may be used in addition to, or instead of, other comparisons discussed herein. When the distance from the input context of the one or more archetype cases is beyond the certain threshold, then one or more explanation factors may be determined and provided 180 in response to the request for the suggested action. For example, the distance from the input context to the one or more archetype cases and/or the one or more archetype cases themselves may be provided as part of the explanation. A human operator may look at the archetype cases and/or the distance to the archetype cases from the input context and, based on that information, may determine to continue to perform 181 the suggested action, not perform the suggested action and perform a different action, or perform no action at all.

Feature Residual Examples

In some embodiments, as part of determining 140 explanation data, feature residuals may be determined. As part of this determination 140, a regional model of two or more cases in the case-based reasoning model may be determined. As noted elsewhere herein, determining a regional model may include determining the cases that are most similar to the input context and/or the suggested case, based on a distance or distance metric or premetric, a number of cases that are most similar, a percentage of model that is most similar, or based on density function. Then, a feature residual for each feature in the regional model, including features that are treated as inputs, may be determined 140 based at least on part on how well the model predicts each feature if it were removed. For example, determining the feature residuals can be accomplished with mean absolute error, variance, and/or other methods such as kurtosis, skew, etc.

The feature residuals may then be sent in the response 150 to the request for the suggested action along with the suggested action. When the feature residuals are within a certain threshold, a system may then automatically cause 199 control based on the suggested action. For example, if the feature residuals are small, such as having mean absolute error, then a system may be confident in performing the suggested action without human review. When the feature residuals are beyond a certain threshold, however, one or more explanation factors may be determined and provided 180 in response to the request for suggested action. For example, if the feature residuals are high, such as having high mean absolute error, then that information may be provided as one or more of the explanation factors, possibly also with the cases in the regional model. A human operator may then review that information in order to determine whether to perform 181 the suggested action, perform 181 a different action, or perform no action at all.

Regional Model Complexity Examples

Returning to determining 140 explanation data, in some embodiments a regional model complexity associated with the one or more candidate cases may be determined 140. Determining a regional model is discussed elsewhere herein and may include determining the cases within a certain distance, the most similar cases, a percentage of cases that are most similar in the model, etc. Determining regional model complexity can include determining, for the model, entropy, whether the variance is high, whether the accuracy is low, whether correlations among variables are low, etc.

After determining 140, a regional model complexity associated with a one or more candidate cases, then the regional model complexity may be included in the response 150 to the request for suggested action. When the regional model complexity is within a certain threshold, control of a system may automatically be caused 199. For example, if a model is not complex, is accurate, etc., then the system may be confident in performing the suggested action. When the regional model complexity is beyond a certain threshold, however, then one or more explanation factors may be determined and provided 180 in response to the request for the suggested action. For example, the regional model complexity, such as the accuracy, conviction, etc., may be provided along with the suggested action in response to the original request for a suggested action. A human operator may review this information and determine based on that information whether to perform 181 the suggested action, perform a different action, or perform no action at all.

Fractal Dimensionality Examples

Returning again to determining 140 explanation data, in some embodiments, a regional model fractal dimensionality associated with the one or more candidate cases may be determined 140. Determining regional model fractal dimensionality may include fitting a hyper box, hyper sphere, or other hyper shape around the regional model. Then the shape, such as the hyper box, is reduced in scale and the count of the number of boxes needed to cover the extent of the regional model is determined 140. The scale used for the boxes and the threshold used may be different in different embodiments. For example, the scale may be based on $\log_e$ or $\log_2$ and the threshold may be different based on the scale.

For example, in some embodiments, the smaller the scale of the smaller boxes used to cover, the higher the threshold may be.

If the number of boxes needed (the regional model fractional dimensionality) is within a certain threshold, cause 199 control of a system may be performed automatically based on the suggested action. For example, if the regional model complexity around the candidate cases is low, then a system may be confident in performing the suggested action and therefore automatically cause 199 control of the system. When the regional model fractional dimensionality is beyond a certain threshold, however, then one or more explanation factors may be determined and provided 180 in response to the request for the suggested action. For example, the regional model dimensionality, and perhaps a picture of the determination of the regional model for fractional dimensionality may be provided in response to the original request for suggested action. A human operator may review that information in order to determine whether to perform 181 the suggested action, a different action, or no action at all.

The comparison with the regional model fractional dimensionality in the threshold may be used in addition to or instead of other comparisons discussed herein.

Conviction Ratios Examples

Returning again to determining 140 explanation data, in some embodiments, the relative surprisal or conviction of a feature within certain scopes, and in comparison to other scopes, can be determined 140. For example, a feature may have high conviction locally (within the near N neighboring cases, as measured by a distance measure such as those described herein), and lower conviction elsewhere, or vice versa. In the former, the feature would be considered locally stable and globally noisy. In the latter, the opposite would hold and it would be locally noisy and globally stable.

Many possible scopes for conviction determination could be used and compared. A few are presented here, and others may also be used. In some embodiments, each scope compared may be a function of the distance from a case. For example, as discussed elsewhere herein a region may be determined. The region may include the N most similar cases to the case in question, the most similar P percent (as compared to the entire model), the cases within distance D, or the cases within a local density distribution, as discussed elsewhere herein. For example, the N most similar cases to the suggested case (or to the input context) may be determined based on a distance measure, such as those described herein. The number N may be a constant, either globally or locally specified, or a relative number, such as a percentage of the total model size. Further, the cases in the region may also be determined based on density. For example, as discussed elsewhere herein, if the cases around the case of interest meet a particular density threshold, those most similar cases could be included in the regional set of cases (and cases not meeting those density thresholds could be excluded). Further, in some embodiments, the similarity (or distance) may be measured based on the context only, the action only, or the context and the action. In some embodiments, only a subset of the context and/or action is used to determine similarity (or distance).

The following are some example measures that may be determined:

W: Conviction of feature in the whole model;
X: Conviction of a feature outside the regional model;
Y: Conviction of a feature inside the regional model;
Z: Conviction of feature for local (k neighbors) model;

where "local" would typically, but not always, constitute a smaller number of cases than the "regional" model.

As discussed elsewhere herein, conviction can be measured in numerous ways, including excluding a feature from a particular model or portion of a model and measure the conviction as a function the surprisal of putting the feature (or features, or data elements) back in. Conviction measures are discussed extensively herein.

As noted, above, other measures (other than W, X, Y, and Z, listed above) can be used. After two (or more) of the conviction measures are calculated, the ratio of those measures may be determined. For example, in some embodiments, a determined 140 ratio may indicate whether a suggested case or feature of a case is "noisy." The noisiness of a feature can be determined 140, in some embodiments, by determining 140 local noisiness and/or relative noisiness. In some embodiments, local noisiness can be determined by looking for the minimum of Y (or looking for the number of cases with Y<1). Relative noisiness may be determined based on the ratio of Z to W. As another example, in some embodiments, a high feature conviction ratio between W and Y may indicate that the feature may be "noisy." The noisiness of the feature may be indicated based on the ratio of W to Y and/or Y to W.

In some embodiments, measure other that W, X, Y, and Z listed above may include measures based on feature importance to a given target, feature importance to the whole model, predictability of a feature with or without confidence bounds, measures of whether features contribute to or detract from accuracy, and/or the like. For example, in some embodiments, the techniques include determining prediction conviction for features based on a conviction of the accuracy of the prediction using residuals. Using such techniques may be beneficial when features that negatively impact accuracy in a region may be considered "noisy" and therefore be useful as a measure to include in the determination 160 of whether to automatically cause 199 performance of a suggested action.

Once the noisiness of a case/feature is determined 140, a decision can later be made whether to cause 199 performance of the suggested action. For example, if the features (or action) of the suggested case are not noisy (locally and/or regionally, depending on the embodiment), then a system may be confident in performing the suggested action in the suggested case. If, however, the features (or action) of the suggested case are noisy, then that noisiness measure may be provided 180 along with the suggested action. A human operator may then review the noisiness data and determine whether to perform 181 the suggested action, a different action, or no action at all.

Prediction Conviction Examples

Returning again to determining 140 explanation data, in some embodiments, the certainty score is a prediction conviction of a suggested case. As such, determining 140 the certainty score can be determined as the prediction conviction. When the prediction conviction is determined 160 to be above a certain threshold, then performance of the suggested action can be caused 199. If the prediction conviction is determined 160 to be below a certain threshold, then the prediction conviction score can be provided 180 along with the suggested cases. A human operator may then review the prediction conviction (and any other explanation data) and determine whether to perform 181 the suggested action, a different action, or no action at all.

Determination of prediction conviction is given below. First, familiarity conviction is discussed. Familiarity conviction is sometimes called simply "conviction" herein. Prediction conviction is also sometimes referred to as simply "conviction" herein. In each instance where conviction is used as the term herein, any of the conviction measures may be used. Further, when familiarity conviction or prediction conviction terms are used, those measure are appropriate, as are the other conviction measures discussed herein.

Feature Prediction Contribution Examples

Returning again to determining 140 explanation data, in some embodiments, feature prediction contribution is determined 140. Various embodiments of determining 140 feature prediction contribution are given below. In some embodiments, feature prediction contribution can be used to flag what features are contributing most (or above a threshold amount) to a suggestion. Such information can be useful for either ensuring that certain features are not used for particular decision making and/or ensuring that certain features are used in particular decision making. If the feature prediction contribution of a prohibited feature is determined 160 to be above a certain threshold, then the suggested action along with explanation data for the feature prediction contribution can be provided 180 to a human operator, who may then perform 181 the suggested action, a different action, or no action at all. If the feature prediction contribution for undesirable features are determined 160 to be below a certain threshold, then performance of the suggested action may be caused 199 automatically.

Consider unknown and undesirable bias in a computer-based reasoning model. An example of this would be a decision-making computer-based reasoning model making a decision based on a characteristic that it should not, such deciding whether to approve a loan based on the height of an applicant. The designers, user, or other operators of a loan approval system may have flagged height as a prohibited factor for decision making. If it is determined 140 that height was a factor (for example, the feature prediction contribution is above a certain threshold) in a loan decision, that information can be provided 180 to a human operator, who may then decide to perform 181 the suggested action (approve the loan notwithstanding that it was made at least in part based on height), a different action, or no action at all. If the feature prediction contribution of height is below the certain threshold, then the loan may be approved without further review based on the contribution of height to the decision.

As noted above, in some embodiments, there may also be features whose contribution are desired (e.g., credit score in the case of a loan approval). In such cases, if the feature prediction contribution for a feature whose contribution is desired is determined 160 to be below a certain threshold, then the suggested action along with the feature prediction contribution may be provided 180 to a human operator who may then decide to perform 181 the suggested action (approve the loan notwithstanding that it was made at without contribution of the desired feature), a different action, or no action at all. If the feature prediction contribution of the desired feature is below the above threshold, then performance of the action may be caused 199 (e.g., loan may be approved) without further review based on the contribution of the desired feature (e.g., credit score) to the decision.

In some embodiments, not depicted in FIG. 1, the feature contribution is used to reduce the size of a model in a computer-based reasoning system. For example, if a feature does not contribute much to a model, then it may be removed from the model. As a more specific example, the feature prediction contribution may be determined for multiple input contexts (e.g., tens of, hundreds of, thousands of, or more) input contexts and the feature contribution may be determined for each feature for each input context. Those features that never reach an exclusionary threshold amount of contribution to a decision (e.g., as determined by the feature prediction contribution) may be excluded from the computer-based reasoning model. In some embodiments, only those features that reach an inclusion threshold may be included in the computer-based reasoning model. In some embodiments, both an exclusionary lower threshold and inclusionary upper threshold may be used. In other embodiments, average contribution of a feature may be used to rank features and the top N features may be those included in the models. Excluding features from the model may be beneficial in embodiments where the size of the model causes the need for extra storage and/or computing power. In many computer-based reasoning systems, smaller models (e.g., with fewer features being analyzed) may be more efficient to store and when making decision. The reduced models may be used, for example, with any of the techniques described herein.

Familiarity Conviction Examples

In some embodiments, it may be useful to employ conviction as measure of how much information the point distorts the model. To do so, one may define feature conviction such that a point's weighted distance contribution affects other points' distance contribution and compared to the expected distance contribution of adding any new point.

Definition 1. Given a point $x \in X$ and the set K of its k nearest neighbors, a distance function d: $R^z \times Z \to R$, and a distance exponent $\alpha$, the distance contribution of x may be the harmonic mean $$\phi(x) = \left( \frac{1}{|K|} \sum_{k \in K} \frac{1}{d(x, k)^\alpha} \right)^{-1}. \quad (1)$$

Definition 2. Given a set of points $X \subset R^z$ for every $x \in X$ and an integer $1 \le k < |X|$ one may define the distance contribution probability distribution, C of X to be the set $$C = \left\{ \frac{\phi(x_1)}{\sum_{i=1}^{n} \phi(x_i)}, \frac{\phi(x_2)}{\sum_{i=1}^{n} \phi(x_i)}, \ldots, \frac{\phi(x_n)}{\sum_{i=1}^{n} \phi(x_i)} \right\} \quad (2)$$

for a function $\phi: X \to R$ that returns the distance contribution.

Note that if $\phi(0) = \infty$, special consideration may be given to multiple identical points, such as splitting the distance contribution among those points.

Remark 1. C may be a valid probability distribution. In some embodiments, this fact is used to compute the amount of information in C.

Definition 3. The point probability of a point $x_i$, i=1, 2, ..., n may be $$l(i) = \frac{\phi(x_i)}{\sum_i \phi(x_i)} \quad (3)$$

where the index i is assigned the probability of the indexed point's distance contribution. One may denote this random variable L.

Remark 2. When points are selected uniformly at random, one may assume L is uniform when the distance probabilities have no trend or correlation.

Definition 4. The conviction of a point $x_i \in X$ may be $$\pi(x_i) = \frac{\frac{1}{|X|} \sum_i \mathbb{KL}(L||L - \{i\} \cup \mathbb{E}l(i))}{\mathbb{KL}(L||L - \{x_i\} \cup \mathbb{E}l(i))} \quad (4)$$

where KL is the Kullback-Leibler divergence. In some embodiments, when one assumes L is uniform, one may have that the expected probability $$\mathbb{E}l(i) = \frac{1}{n}.$$

Prediction Conviction Examples

In some embodiments, it is useful to employ conviction as a proxy for accuracy of a prediction. To do so, one may define another type of conviction such that a point's weighted distance to other points is of primary importance, and can be expressed as the information required to describe the position of the point in question relative to existing points.

Definition 5. Let q be the number of features in a model and n be the number of observations. One may define the residual function of the training data X:

$$r: X \to R^q \quad (5)$$

$$r(x) = J_1(k,p), J_2(k,p), \ldots, J_q(k,p) \quad (6)$$

Where J may be the error function parameterized by the hyperparameters k and p evaluated on points near x. In some embodiments, one may refer to the residual function evaluated on all of the model data as $r_M$.

In some embodiments, one can quantify the information needed to express a distance contribution $\varphi(x)$ by moving to a probability. This may be accomplished by setting the expected value of the Exponential Distribution (which is the maximum entropy distribution constrained by the first moment) to be the magnitude of the residual vector:

$$\frac{1}{\lambda} = \|r(x)\|_p \quad (7)$$

In some embodiments, the distance contribution can be other relevant or applicable distributions, such as the log normal distribution, Gaussian distribution, normal distribution, etc.

In some embodiments, one can then determine the probability that a distance contribution is greater than 0:

$$P(\|r(x)\|_p \le 0) = e^{-\frac{3}{\|r(x)\|_p} \cdot \phi(x)} \quad (8)$$

In some embodiments, one may determine the distance contribution in terms of the probability that two points are the same given their uncertainties, or alternatively the probability that two points are different given their uncertainties. One may also convert the probability to information:

$$I(x) = -\ln P(\|r(x)\|_p \leq 0) \quad (9)$$

Which can be simply written as:

$$I(y) = \frac{\phi(x)}{\|r(x)\|_p} \quad (10)$$

As the distance contribution decreases, or as the residual vector magnitude increases, the less information is needed to represent this point. One can then compare this to the expected value in regular conviction form, yielding a prediction conviction $$\pi_a = \frac{\mathbb{E} I}{I(x)}. \quad (11)$$

where I is the set of information calculated for each point in the model.

Feature Prediction Contribution Examples

In some embodiments, Feature Prediction Contribution may be related Mean Decrease in Accuracy (MDA). In MDA scores are established for models with all the features M and models with each feature held out $M_{-fi}$, i=1 ... q. The difference $|M-M_{-fi}|$ is the importance of each feature, where the result's sign is altered depending on whether the goal is to maximize or minimize score.

In some embodiments, prediction information is correlated with accuracy and thus may be used as a surrogate.

$$M = \frac{1}{n} \sum_i I(x_i)$$

$$M_{-f_i} = \frac{1}{n} \sum_j I_{-f_i}(x_j)$$

One can now make two definitions:
Definition 6. The prediction contribution of feature i is $$\frac{M - M_{-f_i}}{M}$$

Definition 7. The prediction conviction of feature i is $$\frac{\frac{1}{q} \sum_i^q M_{-f_e}}{M_{-f_i}}$$

Additional Embodiments

Not depicted in FIG. 1, more than one of the explanation data may be determined and used together. For example, any of the fractal dimensionality, conviction, complexity, feature residual, feature prediction contribution, regional model complexity, archetype and/or counterfactual cases, and/or other measures can be used together to determine whether to automatically cause 199 performance of the suggested action. For example, the suggested action may be caused 199 if the certainty is high and there are no feature values outside the range of the local model.

Not depicted in FIG. 1, in embodiments described herein, discussion of determining measures such as conviction, complexity, fractal dimensionality, residuals, distances, certainty, surprisal and the like is based on either determining surprisal based on context in a data element, actions in a data element, or both. Notwithstanding that some techniques may be described as using calculation based just on contexts, just on actions, or just on a combination of the two, the techniques can be performing based on any of: context, actions, or a combination of the two. Further, subsets of the contexts, actions, or a combination of the two can be used.

Figure 2:
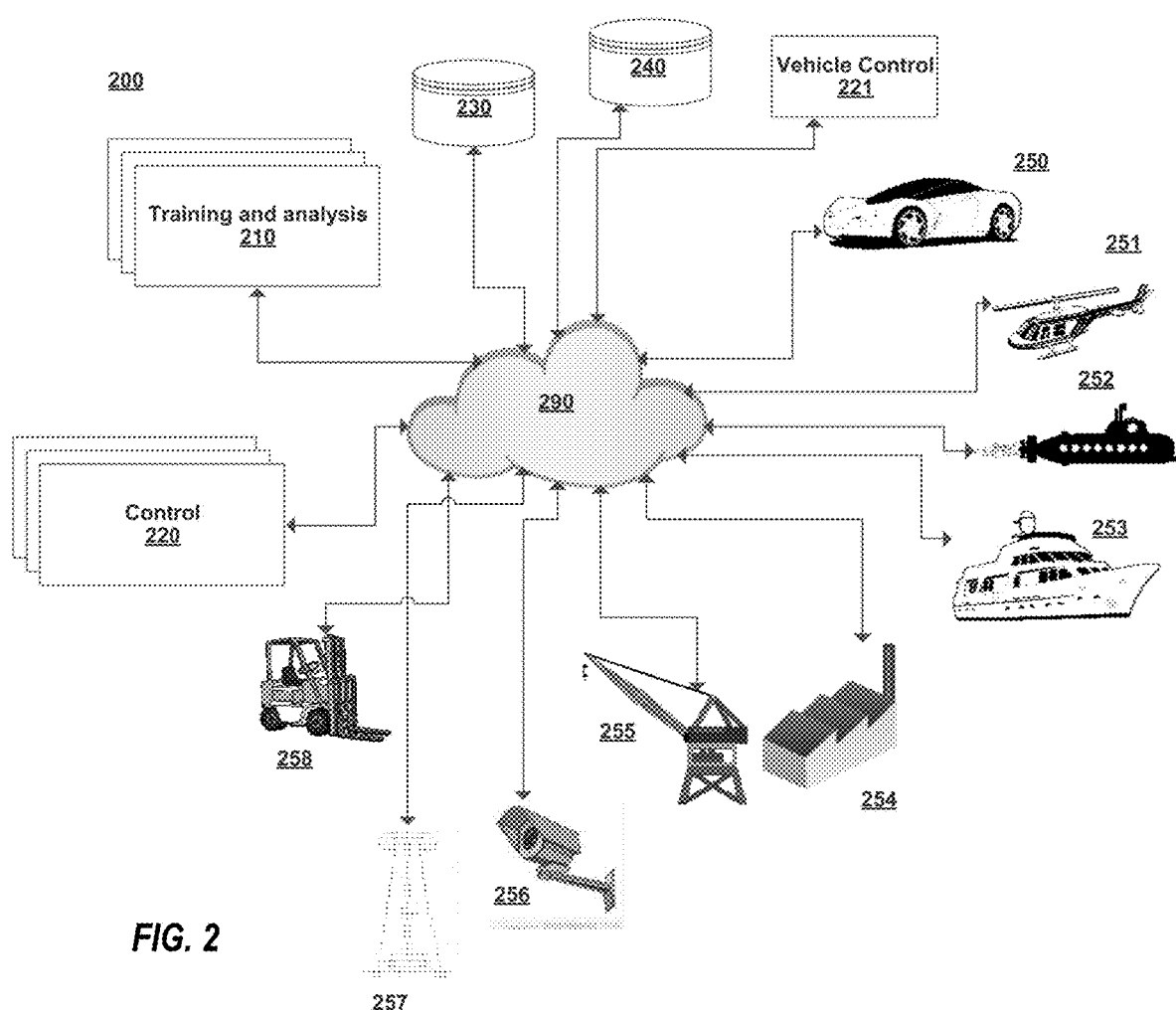
FIG. 2 is a block diagram depicting example systems for explainable and automated decisions in computer-based reasoning systems.

Systems for Feature and Case Importance and Confidence for Explainable and Automated Decisions in Computer-Based Reasoning Systems FIG. 2 is a block diagram depicting example systems for explainable and automated decisions in computer-based reasoning systems. Numerous devices and systems are coupled to a network 290. Network 290 can include the internet, a wide area network, a local area network, a Wi-Fi network, any other network or communication device described herein, and the like. Further, numerous of the systems and devices connected to 290 may have encrypted communication there between, VPNs, and or any other appropriate communication or security measure. System 200 includes a training and analysis system 210 coupled to network 290. The training and analysis system 210 may be used for collecting data related to systems 250-258 and creating computer based reasoning models based on the training of those systems. Further, training and analysis system 210 may perform aspects of process 100 and/or 400 described herein. Control system 220 is also coupled to network 290. A control system 220 may control various of the systems 250-258. For example, a vehicle control 221 may control any of the vehicles 250-253, or the like. In some embodiments, there may be one or more network attached storages 230, 240. These storages 230, 240 may store training data, computer-based reasoning models, updated computer based reasoning models, and the like. In some embodiments, training and analysis system 210 and/or control system 220 may store any needed data including computer based reasoning models locally on the system.

FIG. 2 depicts numerous systems 250-258 that may be controlled by a control system 220 or 221. For example, automobile 250, helicopter 251, submarine 252, boat 253, factory equipment 254, construction equipment 255, security equipment 256, oil pump 257, or warehouse equipment 258 may be controlled by a control system 220 or 221.

Example Processes for Controlling Systems

FIG. 4 depicts an example process 400 for controlling a system. In some embodiments and at a high level, the process 400 proceeds by receiving or receiving 410 a computer-based reasoning model for controlling the system. The computer-based reasoning model may be one created using process 100, as one example. In some embodiments, the process 400 proceeds by receiving 420 a current context for the system, determining 430 an action to take based on the current context and the computer-based reasoning model, and causing 440 performance of the determined action (e.g., labelling an image, causing a vehicle to perform the turn, lane change, waypoint navigation, etc.). If operation of the system continues 450, then the process returns to receive 420 the current context, and otherwise discontinues 460 control of the system. In some embodiments, causing 199 performance of a selected action may include causing 440 performance of a determined action (or vice-versa).

As discussed herein the various processes 100, 400, etc. may run in parallel, in conjunction, together, or one process may be a subprocess of another. Further, any of the processes may run on the systems or hardware discussed herein. The features and steps of processes 100 and 400 could be used in combination and/or in different orders.

Self-Driving Vehicles

Returning to the top of the process 400, it begins by receiving 410 a computer-based reasoning model for controlling the system. The computer-based reasoning model may be received in any appropriate matter. It may be provided via a network 290, placed in a shared or accessible memory on either the training and analysis system 210 or control system 220, or in accessible storage, such as storage 230 or 240.

In some embodiments (not depicted in FIG. 4), an operational situation could be indicated for the system. The operational situation is related to context, but may be considered a higher level, and may not change (or change less frequently) during operation of the system. For example, in the context of control of a vehicle, the operational situation may be indicated by a passenger or operator of the vehicle, by a configuration file, a setting, and/or the like. For example, a passenger Alicia may select "drive like Alicia" in order to have the vehicle driver like her. As another example, a fleet of helicopters may have a configuration file set to operate like Bob. In some embodiments, the operational situation may be detected. For example, the vehicle may detect that it is operating in a particular location (area, city, region, state, or country), time of day, weather condition, etc. and the vehicle may be indicated to drive in a manner appropriate for that operational situation.

The operational situation, whether detected, indicated by passenger, etc., may be changed during operation of the vehicle. For example, a passenger may first indicate that she would like the vehicle to drive cautiously (e.g., like Alicia), and then realize that she is running later and switch to a faster operation mode (e.g., like Carole). The operational situation may also change based on detection. For example, if a vehicle is operating under an operational situation for a particular portion of road, and detects that it has left that portion of road, it may automatically switch to an operational situation appropriate for its location (e.g., for that city), may revert to a default operation (e.g., a baseline program that operates the vehicle) or operational situation (e.g., the last used). In some embodiments, if the vehicle detects that it needs to change operational situations, it may prompt a passenger or operator to choose a new operational situation.

In some embodiments, the computer-based reasoning model is received before process 400 begins (not depicted in FIG. 4), and the process begins by receiving 420 the current context. For example, the computer-based reasoning model may already be loaded into a controller 220 and the process 400 begins by receiving 420 the current context for the system being controlled. In some embodiments, referring to FIG. 2, the current context for a system to be controlled (not depicted in FIG. 2) may be sent to control system 220 and control system 220 may receive 420 current context for the system.

Receiving 420 current context may include receiving the context data needed for a determination to be made using the computer-based reasoning model. For example, turning to the vehicular example, receiving 420 the current context may, in various embodiments, include receiving information from sensors on or near the vehicle, determining information based on location or other sensor information, accessing data about the vehicle or location, etc. For example, the vehicle may have numerous sensors related to the vehicle and its operation, such as one or more of each of the following: speed sensors, tire pressure monitors, fuel gauges, compasses, global positioning systems (GPS), RADARs, LiDARs, cameras, barometers, thermal sensors, accelerometers, strain gauges, noise/sound measurement systems, etc. Current context may also include information determined based on sensor data. For example, the time to impact with the closest object may be determined based on distance calculations from RADAR or LiDAR data, and/or may be determined based on depth-from-stereo information from cameras on the vehicle. Context may include characteristics of the sensors, such as the distance a RADAR or LiDAR is capable of detecting, resolution and focal length of the cameras, etc. Context may include information about the vehicle not from a sensor. For example, the weight of the vehicle, acceleration, deceleration, and turning or maneuverability information may be known for the vehicle and may be part of the context information. Additionally, context may include information about the location, including road condition, wind direction and strength, weather, visibility, traffic data, road layout, etc.

Referring back to the example of vehicle control rules for Bob flying a helicopter, the context data for a later flight of the helicopter using the vehicle control rules based on Bob's operation of the helicopter may include fuel remaining, distance that fuel can allow the helicopter to travel, location including elevation, wind speed and direction, visibility, location and type of sensors as well as the sensor data, time to impact with the N closest objects, maneuverability and speed control information, etc. Returning to the stop sign example, whether using vehicle control rules based on Alicia or Carole, the context may include LiDAR, RADAR, camera and other sensor data, location information, weight of the vehicle, road condition and weather information, braking information for the vehicle, etc.

The control system then determined 430 an action to take based on the current context and the computer-based reasoning model. For example, turning to the vehicular example, an action to take is determined 430 based on the current context and the vehicle control rules for the current operational situation. In some embodiments that use machine learning, the vehicle control rules may be in the form of a neural network (as described elsewhere herein), and the context may be fed into the neural network to determine an action to take. In embodiments using case-based reasoning, the set of context-action pairs closest (or most similar) to the current context may be determined. In some embodiments, only the closest context-action pair is determined, and the action associated with that context-action pair is the determined 430 action. In some embodiments, multiple context-action pairs are determined 430. For example, the N "closest" context-action pairs may be determined 430, and either as part of the determining 430, or later as part of the causing 440 performance of the action, choices may be made on the action to take based on the N closest context-action pairs, where "distance" for between the current context can be measured using any appropriate technique, including use of Euclidean distance, Minkowski distance, Damerau-Levenshtein distance, Kullback-Leibler divergence, and/or any other distance measure, metric, pseudometric, premetric, index, or the like.

In some embodiments, the actions to be taken may be blended based on the action of each context-action pair, with invalid (e.g., impossible or dangerous) outcomes being discarded. A choice can also be made among the N context-action pairs chosen based on criteria such as choosing to use the same or different operator context-action pair from the last determined action. For example, in an embodiment where there are context-action pair sets from multiple operators in the vehicle control rules, the choice of which context-action pair may be based on whether a context-action pair from the same operator was just chosen (e.g., to maintain consistency). The choice among the top N context-action pairs may also be made by choosing at random, mixing portions of the actions together, choosing based on a voting mechanism, etc.

Some embodiments include detecting gaps in the training data and/or vehicle control rules and indicating those during operation of the vehicle (for example, via prompt and/or spoken or graphical user interface) or offline (for example, in a report, on a graphical display, etc.) to indicate what additional training is needed (not depicted in FIG. 4). In some embodiments, when the computer-based reasoning system does not find context "close enough" to the current context to make a confident decision on an action to take, it may indicate this and suggest that an operator might take manual control of the vehicle, and that operation of the vehicle may provide additional context and action data for the computer-based reasoning system. Additionally, in some embodiments, an operator may indicate to a vehicle that she would like to take manual control to either override the computer-based reasoning system or replace the training data. These two scenarios may differ by whether the data (for example, context-action pairs) for the operational scenario are ignored for this time period, or whether they are replaced.

In some embodiments, the operational situation may be chosen based on a confidence measure indicating confidence in candidate actions to take from two (or more) different sets of control rules (not depicted in FIG. 4). Consider a first operational situation associated with a first set of vehicle control rules (e.g., with significant training from Alicia driving on highways) and a second operational situation associated with a second set of vehicle control rules (e.g., with significant training from Carole driving on rural roads). Candidate actions and associated confidences may be determined for each of the sets of vehicle control rules based on the context. The determined 430 action to take may then be selected as the action associated with the higher confidence level. For example, when the vehicle is driving on the highway, the actions from the vehicle control rules associated with Alicia may have a higher confidence, and therefore be chosen. When the vehicle is on rural roads, the actions from the vehicle control rules associated with Carole may have higher confidence and therefore be chosen. Relatedly, in some embodiments, a set of vehicle control rules may be hierarchical, and actions to take may be propagated from lower levels in the hierarchy to high levels, and the choice among actions to take propagated from the lower levels may be made on confidence associated with each of those chosen actions. The confidence can be based on any appropriate confidence calculation including, in some embodiments, determining how much "extra information" in the vehicle control rules is associated with that action in that context.

In some embodiments, there may be a background or baseline operational program that is used when the computer-based reasoning system does not have sufficient data to make a decision on what action to take (not depicted in FIG. 4). For example, if in a set of vehicle control rules, there is no matching context or there is not a matching context that is close enough to the current context, then the background program may be used. If none of the training data from Alicia included what to do when crossing railroad tracks, and railroad tracks are encountered in later operation of the vehicle, then the system may fall back on the baseline operational program to handle the traversal of the railroad tracks. In some embodiments, the baseline model is a computer-based reasoning system, in which case context-action pairs from the baseline model may be removed when new training data is added. In some embodiments, the baseline model is an executive driving engine which takes over control of the vehicle operation when there are no matching contexts in the vehicle control rules (e.g., in the case of a context-based reasoning system, there might be no context-action pairs that are sufficiently "close").

In some embodiments, determining 430 an action to take based on the context can include determining whether vehicle maintenance is needed. As described elsewhere herein, the context may include wear and/or timing related to components of the vehicle, and a message related to maintenance may be determined based on the wear or timing. The message may indicate that maintenance may be needed or recommended (e.g., because preventative maintenance is often performed in the timing or wear context, because issues have been reported or detected with components in the timing or wear context, etc.). The message may be sent to or displayed for a vehicle operator (such as a fleet management service) and/or a passenger. For example, in the context of an automobile with sixty thousand miles, the message sent to a fleet maintenance system may include an indication that a timing belt may need to be replaced in order to avoid a P percent chance that the belt will break in the next five thousand miles (where the predictive information may be based on previously-collected context and action data, as described elsewhere herein). When the automobile reaches ninety thousand miles and assuming the belt has not been changed, the message may include that the chance that the belt will break has increased to, e.g., P*4 in the next five thousand miles.

Performance of the determined 430 action is then caused 440. Turning to the vehicular example, causing 440 performance of the action may include direct control of the vehicle and/or sending a message to a system, device, or interface that can control the vehicle. The action sent to control the vehicle may also be translated before it is used to control the vehicle. For example, the action determined 430 may be to navigate to a particular waypoint. In such an embodiment, causing 440 performance of the action may include sending the waypoint to a navigation system, and the navigation system may then, in turn, control the vehicle on a finer-grained level. In other embodiments, the determined 430 action may be to switch lanes, and that instruction may be sent to a control system that would enable the car to change the lane as directed. In yet other embodiments, the action determined 430 may be lower-level (e.g., accelerate or decelerate, turn 4° to the left, etc.), and causing 440 performance of the action may include sending the action to be performed to a control of the vehicle, or controlling the vehicle directly. In some embodiments, causing 440 performance of the action includes sending one or more messages for interpretation and/or display. In some embodiments, the causing 440 the action includes indicating the action to be taken at one or more levels of a control hierarchy for a vehicle. Examples of control hierarchies are given elsewhere herein.

Some embodiments include detecting anomalous actions taken or caused 440 to be taken. These anomalous actions may be signaled by an operator or passenger, or may be detected after operation of the vehicle (e.g., by reviewing log files, external reports, etc.). For example, a passenger of a vehicle may indicate that an undesirable maneuver was made by the vehicle (e.g., turning left from the right lane of a 2-lane road) or log files may be reviewed if the vehicle was in an accident. Once the anomaly is detected, the portion of the vehicle control rules (e.g., context-action pair(s)) related to the anomalous action can be determined. If it is determined that the context-action pair(s) are responsible for the anomalous action, then those context-action pairs can be removed or replaced using the techniques herein.

Referring to the example of the helicopter fleet and the vehicle control rules associated with Bob, the vehicle control 220 may determine 430 what action to take for the helicopter based on the received 420 context. The vehicle control 220 may then cause the helicopter to perform the determined action, for example, by sending instructions related to the action to the appropriate controls in the helicopter. In the driving example, the vehicle control 220 may determine 430 what action to take based on the context of vehicle. The vehicle control may then cause 440 performance of the determined 430 action by the automobile by sending instructions to control elements on the vehicle.

If there are more 450 contexts for which to determine actions for the operation of the system, then the process 400 returns to receive 410 more current contexts. Otherwise, process 400 ceases 460 control of the system. Turning to the vehicular example, as long as there is a continuation of operation of the vehicle using the vehicle control rules, the process 400 returns to receive 420 the subsequent current context for the vehicle. If the operational situation changes (e.g., the automobile is no longer on the stretch of road associated with the operational situation, a passenger indicates a new operational situation, etc.), then the process returns to determine the new operational situation. If the vehicle is no longer operating under vehicle control rules (e.g., it arrived at its destination, a passenger took over manual control, etc.), then the process 400 will discontinue 460 autonomous control of the vehicle.

Many of the examples discussed herein for vehicles discuss self-driving automobiles. As depicted in FIG. 2, numerous types of vehicles can be controlled. For example, a helicopter 251 or drone, a submarine 252, or boat or freight ship 253, or any other type of vehicle such as plane or drone (not depicted in FIG. 2), construction equipment, (not depicted in FIG. 2), and/or the like. In each case, the computer-based reasoning model may differ, including using different features, using different techniques described herein, etc. Further, the context of each type of vehicle may differ. Flying vehicles may need context data such as weight, lift, drag, fuel remaining, distance remaining given fuel, windspeed, visibility, etc. Floating vehicles, such as boats, freight vessels, submarines, and the like may have context data such as buoyancy, drag, propulsion capabilities, speed of currents, a measure of the choppiness of the water, fuel remaining, distance capability remaining given fuel, and the like. Manufacturing and other equipment may have as context width of area traversing, turn radius of the vehicle, speed capabilities, towing/lifting capabilities, and the like.

Image Labelling

The techniques herein may also be applied in the context of an image-labeling system. For example, numerous experts may label images (e.g., identifying features of or elements within those images). For example, the human experts may identify cancerous masses on x-rays. Having these experts label all input images is incredibly time consuming to do on an ongoing basis, in addition to being expensive (paying the experts). The techniques herein may be used to train an image-labeling computer-based reasoning model based on previously-trained images. Once the image-labeling computer-based reasoning system has been built, then input images may be analyzed using the image-based reasoning system. In order to build the image-labeling computer-based reasoning system, images may be labeled by experts and used as training data. Using the techniques herein, the surprisal of the training data can be used to build an image-labeling computer-based reasoning system that balances the size of the computer-based reasoning model with the information that each additional image (or set of images) with associated labels provides. Once the image-labelling computer-based reasoning is trained, it can be used to label images in the future. For example, a new image may come in, the image-labelling computer-based reasoning may determine one or more labels for the image, and then the one or more labels may then be applied to the image. Thus, these images can be labeled automatically, saving the time and expense related to having experts label the images.

In some embodiments, processes 100 or 400 may include determining the surprisal of each image (or multiple images) and the associated labels or of the aspects of the computer-based reasoning model. The surprisal for the one or more images may be determined and a determination may be made whether to select or include the one or more images (or aspects) in the image-labeling computer-based reasoning model based on the determined surprisal. While there are more sets of one or more images with labels to assess, the process may return to determine whether more image or label sets should be included or whether aspects should be included and/or changed in the model. Once there are no more images or aspects to consider, the process can turn to controlling the image analysis system using the image-labeling computer-based reasoning.

In some embodiments, process 100 may determine (e.g., in response to a request) the suggested cases and explanation data for in the image-labeling computer-based reasoning model. Based on a determination made based on the suggested action and/or explanation data, the process can cause 199 control of an image-labeling system using process 400. For example, if the data elements are related to images and labels applied to those images, then the image-labeling computer-based reasoning model trained on that data will apply labels to incoming images. Process 400 proceeds by receiving 410 an image-labeling computer-based reasoning model. The process proceeds by receiving 420 an image for labeling. The image-labeling computer-based reasoning model is then used to determine 430 labels for the input image. The image is then labeled 440. If there are more 450 images to label, then the system returns to receive 410 those images and otherwise ceases 460. In such embodiments, the image-labeling computer-based reasoning model may be used to select labels based on which training image is "closest" (or most similar) to the incoming image. The label(s) associated with that image will then be selected to apply to the incoming image.

Manufacturing and Assembly

The process 100 may also be applied in the context of manufacturing and/or assembly. For example, conviction can be used to identify normal behavior versus anomalous behavior of such equipment. Using the techniques herein, a crane (e.g., crane 255 of FIG. 2), robot arm, or other actuator is attempting to "grab" something and its surprisal is too high, it can stop, sound an alarm, shutdown certain areas of the facility, and/or request for human assistance. Anomalous behavior that is detected via conviction among sensors and actuators can be used to detect when there is some sort breakdown, unusual wear and tear or mechanical or other malfunction, an unusual component or seed or crop, etc. It can also be used to find damaged equipment for repairs or buffing or other improvements for any robots that are searching and correcting defects in products or themselves (e.g., fixing a broken wire or smoothing out cuts made to the ends of a manufactured artifact made via an extrusion process). Conviction can also be used for cranes and other grabbing devices to find which cargo or items are closest matches to what is needed. Conviction can be used to drastically reduce the amount of time to train a robot to perform a new task for a new product or custom order, because the robot will indicate the aspects of the process it does not understand and direct training towards those areas and away from things it has already learned. Combining this with stopping ongoing actions when an anomalous situation is detected would also allow a robot to begin performing work before it is fully done training, the same way that a human apprentice may help out someone experienced while the apprentice is learning the job. Conviction can also inform what features or inputs to the robot are useful and which are not.

In some embodiments, process 100 may determine (e.g., in response to a request) the surprisal of one or more data elements (e.g., of the manufacturing equipment) or aspects (e.g., features of context-action pairs or aspects of the model) to potentially include in the manufacturing control computer-based reasoning model. The surprisal for the one or more manufacturing elements may be determined and a determination may be made whether to select or include the one or more manufacturing data elements or aspects in the manufacturing control computer-based reasoning model based on the determined surprisal. While there are more sets of one or more manufacturing data elements or aspects to assess, the process may return to determine whether more manufacturing data elements or aspects sets should be included. Once there are no more manufacturing data elements or aspects to consider, the process can turn to controlling the manufacturing system using the manufacturing control computer-based reasoning system.

In some embodiments, process 100 may determine (e.g., in response to a request) the suggested cases and explanation data for in the manufacturing control computer-based reasoning model. Based on a determination made based on the suggested action and/or explanation data, the process can cause 199 control of a manufacturing system may be accomplished by process 400. For example, if the data elements are related to manufacturing data elements or aspects, then the manufacturing control computer-based reasoning model trained on that data will control manufacturing or assemble. Process 400 proceeds by receiving 410 a manufacturing control computer-based reasoning model. The process proceeds by receiving 420 a context. The manufacturing control computer-based reasoning model is then used to determine 430 an action to take. The action is then performed by the control system (e.g., caused by the manufacturing control computer-based reasoning system). If there are more 450 contexts to consider, then the system returns to receive 410 those contexts and otherwise ceases 460. In such embodiments, the manufacturing control computer-based reasoning model may be used to control a manufacturing system. The chosen actions are then performed by a control system.

Smart Voice Control

The processes 100 and 400 may also be applied in the context of smart voice control. For example, combining multiple inputs and forms of analysis, the techniques herein can recognize if there is something unusual about a voice control request. For example, if a request is to purchase a high-priced item or unlock a door, but the calendar and synchronized devices indicate that the family is out of town, it could send a request to the person's phone before confirming the order or action; it could be that an intruder has recorded someone's voice in the family or has used artificial intelligence software to create a message and has broken in. It can detect other anomalies for security or for devices activating at unusual times, possibly indicating some mechanical failure, electronics failure, or someone in the house using things abnormally (e.g., a child frequently leaving the refrigerator door open for long durations). Combined with other natural language processing techniques beyond sentiment analysis, such as vocal distress, a smart voice device can recognize that something is different and ask, improving the person's experience and improving the seamlessness of the device into the person's life, perhaps playing music, adjusting lighting, or HVAC, or other controls. The level of confidence provided by conviction can also be used to train a smart voice device more quickly as it can ask questions about aspects of its use that it has the least knowledge about. For example: "I noticed usually at night, but also some days, you turn the temperature down in what situations should I turn the temperature down? What other inputs (features) should I consider?"

Using the techniques herein, a smart voice device may also be able to learn things it otherwise may not be able to. For example, if the smart voice device is looking for common patterns in any of the aforementioned actions or purchases and the conviction drops below a certain threshold, it can ask the person if it should take on a particular action or additional autonomy without prompting, such as "It looks like you're normally changing the thermostat to colder on days when you have your exercise class, but not on days when it is cancelled; should I do this from now on and prepare the temperature to your liking?"

In some embodiments, process 100 may determine (e.g., in response to a request) the surprisal of one or more data elements (e.g., of the smart voice system) or aspects (e.g., features of the data or parameters of the model) to potentially include in the smart voice system control computer-based reasoning model. The surprisal for the one or more smart voice system data elements or aspects may be determined and a determination may be made whether to include the one or more smart voice system data elements or aspects in the smart voice system control computer-based reasoning model based on the determined surprisal. While there are more sets of one or more smart voice system data elements or aspects to assess, the process may return to determine whether more smart voice system data elements or aspects sets should be included. Once there are no more smart voice system data elements or aspects to consider, the process can turn to controlling the smart voice system using the smart voice system control computer-based reasoning model.

In some embodiments, process 100 may determine (e.g., in response to a request) the suggested cases and explanation data for in the smart voice computer-based reasoning model. Based on a determination made based on the suggested action and/or explanation data, the process can cause 199 control of a smart voice system using process 400. For example, if the data elements are related to smart voice system actions, then the smart voice system control computer-based reasoning model trained on that data will control smart voice systems. Process 400 proceeds by receiving 410 a smart voice computer-based reasoning model. The process proceeds by receiving 420 a context. The smart voice computer-based reasoning model is then used to determine 430 an action to take. The action is then performed by the control system (e.g., caused by the smart voice computer-based reasoning system). If there are more 450 contexts to consider, then the system returns to receive 410 those contexts and otherwise ceases 460. In such embodiments, the smart voice computer-based reasoning model may be used to control a smart voice system. The chosen actions are then performed by a control system.

Control of Federated Devices

The process 100 may also be applied in the context of federated devices in a system. For example, combining multiple inputs and forms of analysis, the techniques herein can recognize if there is something that should trigger action based on the state of the federated devices. For example, if the training data includes actions normally taken and/or statuses of federated devices, then an action to take could be an often-taken action in the certain (or related contexts). For example, in the context of a smart home with interconnected heating, cooling, appliances, lights, locks, etc., the training data could be what a particular user does at certain times of day and/or in particular sequences. For example, if, in a house, the lights in the kitchen are normally turned off after the stove has been off for over an hour and the dishwasher has been started, then when that context again occurs, but the kitchen light has not been turned off, the computer-based reasoning system may cause an action to be taken in the smart home federated systems, such as prompting (e.g., audio) whether the user of the system would like the kitchen lights to be turned off. As another example, training data may indicate that a user sets the house alarm and locks the door upon leaving the house (e.g., as detected via geofence). If the user leaves the geofenced location of the house and has not yet locked the door and/or set the alarm, the computer-based reasoning system may cause performance of an action such as inquiring whether it should lock the door and/or set an alarm. As yet another example, in the security context, the control may be for turning on/off cameras, or enact other security measures, such as sounding alarms, locking doors, or even releasing drones and the like. Training data may include previous logs and sensor data, door or window alarm data, time of day, security footage, etc. and when security measure were (or should have been) taken. For example, a context such as particular window alarm data for a particular basement window coupled with other data may be associated with an action of sounding an alarm, and when a context occurs related to that context, an alarm may be sounded.

In some embodiments, process 100 may determine the surprisal of one or more data elements or aspects of the federated device control system for potential inclusion in the federated device control computer-based reasoning model. The surprisal for the one or more federated device control system data elements may be determined and a determination may be made whether to select or include the one or more federated device control system data elements in the federated device control computer-based reasoning model based on the determined surprisal. While there are more sets of one or more federated device control system data elements or aspects to assess, the process may return to determine whether more federated device control system data elements or aspect sets should be included. Once there are no more federated device control system data elements or aspects to consider, the process can turn to controlling the federated device control system using the federated device control computer-based reasoning model.

In some embodiments, process 100 may determine (e.g., in response to a request) the suggested cases and explanation data for in the federated device computer-based reasoning model. Based on a determination made based on the suggested action and/or explanation data, the process can cause 199 control of a federated device system may be accomplished by process 400. For example, if the data elements are related to federated device system actions, then the federated device control computer-based reasoning model trained on that data will control federated device control system. Process 400 proceeds by receiving 410 a federated device control computer-based reasoning model. The process proceeds by receiving 420 a context. The federated device control computer-based reasoning model is then used to determine 430 an action to take. The action is then performed by the control system (e.g., caused by the federated device control computer-based reasoning system). If there are more 450 contexts to consider, then the system returns to receive 410 those contexts and otherwise ceases 460. In such embodiments, the federated device control computer-based reasoning model may be used to control federated devices. The chosen actions are then performed by a control system.

Control and Automation of Experiments

The process 100 may also be used in the context of control systems for laboratory experiments. For example, many lab experiments today, especially in the biological and life sciences, but also in materials science and others, yield combinatorial increases, in terms of numbers, of possibilities and results. The fields of design of experiment, as well as many combinatorial search and exploration techniques are currently combined with statistical analysis. However, conviction-based techniques such as those herein can be used to guide a search for knowledge, especially if combined with utility functions. Automated lab experiments may have actuators and may put different chemicals, samples, or parts in different combinations and put them under different circumstances. Using conviction to guide the machines enables them to hone in on learning how the system under study responds to different scenarios, and, for example, searching areas of greatest uncertainty. Conceptually speaking, when the surprisal is combined with a value function, especially in a multiplicative fashion, then the combination is a powerful information theoretic take on the classic exploration vs exploitation trade-offs that are made in search processes from artificial intelligence to science to engineering. Additionally, such a system can be made to automate experiments where it can predict the most effective approach, homing in on the best possible, predictable outcomes for a specific knowledge base. Further, like in the other embodiments discussed herein, it could indicate (e.g., raise alarms) to human operators when the results are anomalous, or even tell which features being measured are most useful (so that they can be appropriately measured) or when measurements are not sufficient to characterize the outcomes. If the system has multiple kinds of sensors that have "costs" (e.g., monetary, time, computation, etc.) or cannot be all activated simultaneously, the feature entropies could be used to activate or deactivate the sensors to reduce costs or improve the distinguishability of the experimental results.

In some embodiments, process 100 may determine (e.g., in response to a request) the surprisal of one or more data elements or aspects of the experiment control system. The surprisal for the one or more experiment control system data elements or aspects may be determined and a determination may be made whether to select or include the one or more experiment control system data elements or aspects in experiment control computer-based reasoning model based on the determined surprisal. While there are more sets of one or more experiment control system data elements or aspects to assess, the process may return to determine whether more experiment control system data elements or aspects sets should be included. Once there are no more experiment control system data elements or aspects to consider, the process can turn to causing 181 control of the experiment control system using the experiment control computer-based reasoning model.

In some embodiments, process 100 may determine (e.g., in response to a request) the suggested cases and explanation data for in the experiment control computer-based reasoning model. Based on a determination made based on the suggested action and/or explanation data, the process can cause 199 control of an experiment control system may be accomplished by process 400. For example, if the data elements are related to experiment control system actions, then the experiment control computer-based reasoning model trained on that data will control experiment control system. Process 400 proceeds by receiving 410 an experiment control computer-based reasoning model. The process proceeds by receiving 420 a context. The experiment control computer-based reasoning model is then used to determine 430 an action to take. The action is then performed by the control system (e.g., caused by the experiment control computer-based reasoning system). If there are more 450 contexts to consider, then the system returns to receive 410 those contexts and otherwise ceases 460. In such embodiments, the experiment control computer-based reasoning model may be used to control experiment. The chosen actions are then performed by a control system.

Control of Energy Transfer Systems

The process 100 may also be applied in the context of control systems for energy transfer. For example, a building may have numerous energy sources, including solar, wind, grid-based electrical, batteries, on-site generation (e.g., by diesel or gas), etc. and may have many operations it can perform, including manufacturing, computation, temperature control, etc. The techniques herein may be used to control when certain types of energy are used and when certain energy consuming processes are engaged. For example, on sunny days, roof-mounted solar cells may provide enough low-cost power that grid-based electrical power is discontinued during a particular time period while costly manufacturing processes are engaged. On windy, rainy days, the overhead of running solar panels may overshadow the energy provided, but power purchased from a wind-generation farm may be cheap, and only essential energy consuming manufacturing processes and maintenance processes are performed.

In some embodiments, process 100 may determine (e.g., in response to a request) the surprisal of one or more data elements or aspects of the energy transfer system. The surprisal for the one or more energy transfer system data elements or aspects may be determined and a determination may be made whether to select or include the one or more energy transfer system data elements or aspects in energy control computer-based reasoning model based on the determined surprisal. While there are more sets of one or more energy transfer system data elements or aspects to assess, the process may return to determine whether more energy transfer system data elements or aspects should be included. Once there are no more energy transfer system data elements or aspects to consider, the process can turn to controlling the energy transfer system using the energy control computer-based reasoning model.

In some embodiments, process 100 may determine (e.g., in response to a request) the suggested cases and explanation data for in the energy transfer computer-based reasoning model. Based on a determination made based on the suggested action and/or explanation data, the process can cause 199 control of an energy transfer system may be accomplished by process 400. For example, if the data elements are related to energy transfer system actions, then the energy control computer-based reasoning model trained on that data will control energy transfer system. Process 400 proceeds by receiving 410 an energy control computer-based reasoning model. The process proceeds by receiving 420 a context. The energy control computer-based reasoning model is then used to determine 430 an action to take. The action is then performed by the control system (e.g., caused by the energy control computer-based reasoning system). If there are more 450 contexts to consider, then the system returns to receive 410 those contexts and otherwise ceases 460. In such embodiments, the energy control computer-based reasoning model may be used to control energy. The chosen actions are then performed by a control system.

Health Care Decision Making, Prediction, and Fraud Protection

The processes 100, 400 may also be used for health care decision making, prediction (such as outcome prediction), and/or fraud detection. For example, some health insurers require pre-approval, pre-certification, pre-authorization, and/or reimbursement for certain types of healthcare procedures, such as healthcare services, administration of drugs, surgery, hospital visits, etc. When analyzing pre-approvals, a health care professional must contact the insurer to obtain their approval prior to administering care, or else the health insurance company may not cover the procedure. Not all services require pre-approval, but many may, and which require it can differ among insurers. Health insurance companies may make determinations including, but not necessarily limited to, whether a procedure is medically necessary, whether it is duplicative, whether it follows currently-accepted medical practice, whether there are anomalies in the care or its procedures, whether there are anomalies or errors with the health care provider or professional, etc.

In some embodiments, a health insurance company may have many "features" of data on which health care pre-approval or reimbursement decisions are determined by human operators. These features may include diagnosis information, type of health insurance, requesting health care professional and facility, frequency and/or last claim of the particular type, etc. The data on previous decisions can be used to train the computer-based reasoning system. The techniques herein may be used to guide the health care decision making process. For example, when the computer-based reasoning model determines, with high conviction or confidence, that a procedure should be pre-approved or reimbursed, it may pre-approve or reimburse the procedure without further review. In some embodiments, when the computer-based reasoning model has low conviction re whether or not to pre-approve a particular procedure, it may flag it for human review (including, e.g., sending it back to the submitting organization for further information). In some embodiments, some or all of the rejections of procedure pre-approval or reimbursement may be flagged for human review.

Further, in some embodiments, the techniques herein can be used to flag trends, anomalies, and/or errors. For example, as explained in detail elsewhere herein, the techniques can be used to determine, for example, when there are anomalies for a request for pre-approval, diagnoses, reimbursement requests, etc. with respect to the computer-based reasoning model trained on prior data. When the anomaly is detected, (e.g., outliers, such as a procedure or prescription has been requested outside the normal range of occurrences per time period, for an individual that is outside the normal range of patients, etc.; and/or what may be referred to as "inliers"—or "contextual outliers," such as too frequently (or rarely) occurring diagnoses, procedures, prescriptions, etc.), the pre-approval, diagnosis, reimbursement request, etc. can be flagged for further review. In some cases, these anomalies could be errors (e.g., and the health professional or facility may be contacted to rectify the error), acceptable anomalies (e.g., patients that need care outside of the normal bounds), or unacceptable anomalies. Additionally, in some embodiments, the techniques herein can be used to determine and flag trends (e.g., for an individual patient, set of patients, health department or facility, region, etc.). The techniques herein may be useful not only because they can automate and/or flag pre-approval decision, reimbursement requests, diagnosis, etc., but also because the trained computer-based reasoning model may contain information (e.g., prior decision) from multiple (e.g., 10s, 100s, 1000s, or more) prior decision makers. Consideration of this large amount of information may be untenable for other approaches, such as human review.

The techniques herein may also be used to predict adverse outcomes in numerous health care contexts. The computer-based reasoning model may be trained with data from previous adverse events, and perhaps from patients that did not have adverse events. The trained computer-based reasoning system can then be used to predict when a current or prospective patient or treatment is likely to cause an adverse event. For example, if a patient arrives at a hospital, the patient's information and condition may be assessed by the computer-based reasoning model using the techniques herein in order to predict whether an adverse event is probable (and the conviction of that determination). As a more specific example, if a septuagenarian with a history of low blood pressure is admitted for monitoring a heart murmur, the techniques herein may flag that patient for further review. In some embodiments, the determination of a potential adverse outcome may be an indication of one or more possible adverse events, such as a complication, having an additional injury, sepsis, increased morbidity, and/or getting additionally sick, etc. Returning to the example of the septuagenarian with a history of low blood pressure, the techniques herein may indicate that, based on previous data, the possibility of a fall in the hospital is unduly high (possibly with high conviction). Such information can allow the hospital to try to ameliorate the situation and attempt to prevent the adverse event before it happens.

In some embodiments, the techniques herein include assisting in diagnosis and/or diagnosing patients based on previous diagnosis data and current patient data. For example, a computer-based reasoning model may be trained with previous patient data and related diagnoses using the techniques herein. The diagnosis computer-based reasoning model may then be used in order to suggest one or more possible diagnoses for the current patient. As a more specific example, a septuagenarian may present with specific attributes, medical history, family history, etc. This information may be used as the input context to the diagnosis computer-based reasoning system, and the diagnosis computer-based reasoning system may determine one or more possible diagnoses for the septuagenarian. In some embodiments, those possible diagnoses may then be assessed by medical professionals. The techniques herein may be used to diagnose any condition, including, but not limited to breast cancer, lung cancer, colon cancer, prostate cancer, bone metastases, coronary artery disease, congenital heart defect, brain pathologies, Alzheimer's disease, and/or diabetic retinopathy.

In some embodiments, the techniques herein may be used to generate synthetic data that mimics, but does not include previous patient data. This synthetic data generation is available for any of the uses of the techniques described herein (manufacturing, image labelling, self-driving vehicles, etc.), and can be particularly important in circumstances where using user data (such as patient health data) in a model may be contrary to policy or regulation. As discussed elsewhere herein, the synthetic data can be generated to directly mimic the characteristics of the patient population, or more surprising data can be generated (e.g., higher surprisal) in order to generate more data in the edge cases, all without a necessity of including actual patient data.

In some embodiments, processes 100, 400 may include determining (e.g., in response to a request) the surprisal and/or conviction of one or more data elements or aspects of the health care system. The surprisal or conviction for the one or more health care system data elements or aspects may be determined and a determination may be made whether to select or include the one or more health care system data elements or aspects in a health care system computer-based reasoning model based on the determined surprisal and/or conviction. While there are more sets of one or more health care system data elements or aspects to assess, the process may return to determine whether more health care system data elements or aspects should be included. Once there are no more health care system data elements or aspects to consider included in the model, the process can turn to controlling the health care computer-based reasoning system using the health care system computer-based reasoning model.

In some embodiments, process 100 may determine (e.g., in response to a request) the search result (e.g., k nearest neighbors, most probable cases in gaussian process regression, etc.) in the computer-based reasoning model for use in the health care system computer-based reasoning model. Based on those search results, the process can cause 199 control of a health care computer-based reasoning system using process 400. For example, if the data elements are related to health care system actions, then the health care system computer-based reasoning model trained on that data will control the health care system. Process 400 proceeds by receiving 410 a health care system computer-based reasoning model. The process proceeds by receiving 420 a context. The health care system computer-based reasoning model is then used to determine 430 an action to take. The action is then performed by the control system (e.g., caused by the health care system computer-based reasoning system). If there are more 450 contexts to consider, then the system returns to receive 410 those contexts and otherwise ceases 460. In such embodiments, the health care system computer-based reasoning model may be used to assess health care decisions, predict outcomes, etc. In some embodiments, the chosen action(s) are then performed by a control system.

Financial Decision Making, Prediction, and Fraud Protection

The processes 100, 400 may also be used for financial decision making, prediction (such as outcome or performance prediction), and/or fraud detection. For example, some financial systems require approval, certification, authorization, and/or reimbursement for certain types of financial transactions, such as loans, lines of credit, credit or charge approvals, etc. When analyzing approvals, a financial professional may determine, as one example, whether to approve prior to loaning money. Not all services or transactions require approval, but many may, and which require it can differ among financial system or institutions. Financial transaction companies may make determinations including, but not necessarily limited to, whether a loan appears to be viable, whether a charge is duplicative, whether a loan, charge, etc. follows currently-accepted practice, whether there are anomalies associated with the loan or charge, whether there are anomalies or errors with the any party to the loan, etc.

In some embodiments, a financial transaction company may have many "features" of data on which financial system decisions are determined by human operators. These features may include credit score, type of financial transaction (loan, credit card transaction, etc.), requesting financial system professional and/or facility (e.g., what bank, merchant, or other requestor), frequency and/or last financial transaction of the particular type, etc. The data on previous decisions can be used to train the computer-based reasoning system. The techniques herein may be used to guide the financial system decision making process. For example, when the computer-based reasoning model determines, with high conviction or confidence, that a financial transaction should be approved (e.g. with high conviction), it may then approve the transaction without further review (e.g., by a human operator). In some embodiments, when the computer-based reasoning model has low conviction re whether or not to approve a particular transaction, it may flag it for human review (including, e.g., sending it back to the submitting organization for further information or analysis). In some embodiments, some or all of the rejections of approvals may be flagged for human review.

Further, in some embodiments, the techniques herein can be used to flag trends, anomalies, and/or errors. For example, as explained in detail elsewhere herein, the techniques can be used to determine, for example, when there are anomalies for a request for approval, etc. with respect to the computer-based reasoning model trained on prior data. When the anomaly is detected, (e.g., outliers, such as a transaction has been requested outside the normal range of occurrences per time period, for an individual that is outside the normal range of transactions or approvals, etc.; and/or what may be referred to as "inliers"—or "contextual outliers," such as too frequently (or rarely) occurring types of transactions or approvals, unusual densities or changes to densities of the data, etc.), the approval may be flagged for further review. In some cases, these anomalies could be errors (e.g., and the financial professional or facility may be contacted to rectify the error), acceptable anomalies (e.g., transactions or approvals are legitimate, even if outside of the normal bounds), or unacceptable anomalies. Additionally, in some embodiments, the techniques herein can be used to determine and flag trends (e.g., for an individual customer or financial professional, set of individuals, financial department or facility, systems, etc.). The techniques herein may be useful not only because they can automate and/or flag approval decisions, transactions, etc., but also because the trained computer-based reasoning model may contain information (e.g., prior decision) from multiple (e.g., 10s, 100s, 1000s, or more) prior decision makers. Consideration of this large amount of information may be untenable for other approaches, such as human review.

In some embodiments, the techniques herein may be used to generate synthetic data that mimics, but does not include previous financial data. This synthetic data generation is available for any of the uses of the techniques described herein (manufacturing, image labelling, self-driving vehicles, etc.), and can be particularly important in circumstances where using user data (such as financial data) in a model may be contrary to contract, policy, or regulation. As discussed elsewhere herein, the synthetic data can be generated to directly mimic the characteristics of the financial transactions and/or users, or more surprising data can be generated (e.g., higher surprisal) in order to generate more data in the edge cases, all without including actual financial data.

In some embodiments, processes 100, 400 may include determining (e.g., in response to a request) the surprisal and/or conviction of one or more data elements or aspects of the financial system. The surprisal or conviction for the one or more financial system data elements or aspects may be determined and a determination may be made whether to select or include the one or more financial system data elements or aspects in a financial system computer-based reasoning model based on the determined surprisal and/or conviction. While there are more sets of one or more financial system data elements or aspects to assess, the process may return to determine whether more financial system data elements or aspects should be included. Once there are no more financial system data elements or aspects to consider included in the model, the process can turn to controlling the financial system computer-based reasoning system using the financial system computer-based reasoning model.

In some embodiments, process 100 may determine (e.g., in response to a request) the search result (e.g., k nearest neighbors, most probable cases in gaussian process regression, etc.) in the computer-based reasoning model for use in the financial system computer-based reasoning model. Based on those search results, the process can cause 199 control of a financial system computer-based reasoning system using process 400. For example, if the data elements are related to financial system actions, then the financial system computer-based reasoning model trained on that data will control the financial system. Process 400 proceeds by receiving 410 a financial system computer-based reasoning model. The process proceeds by receiving 420 a context. The financial system computer-based reasoning model is then used to determine 430 an action to take. The action is then performed by the control system (e.g., caused by the financial system computer-based reasoning system). If there are more 450 contexts to consider, then the system returns to receive 410 those contexts and otherwise ceases 460. In such embodiments, the financial system computer-based reasoning model may be used to assess financial system decisions, predict outcomes, etc. In some embodiments, the chosen action(s) are then performed by a control system.

Real Estate Future Value and Valuation Prediction

The techniques herein may also be used for real estate value estimation. For example, the past values and revenue from real estate ventures may be used as training data. This data may include, in addition to value (e.g., sale or resale value), compound annual growth rate ("CAGR"), zoning, property type (e.g., multifamily, Office, Retail, Industrial), adjacent business and types, asking rent (e.g., rent per square foot ("sqft") for each of Office, Retail, Industrial, etc. and/or per unit (for multifamily buildings), further, this may be based on all properties within the selected property type in a particular geography, for example), capitalization rate (or "cap rate" based on all properties within selected property type in a geography), demand (which may be quantified as occupied stock), market capitalization (e.g., an average modeled price per sqft multiplied by inventory sqft of the given property type and/or in a given geography), net absorption (net change in demand for a rolling 12 month period), net completions (e.g., net change in inventory sqft (Office, Retail, Industrial) or units (Multifamily) for a period of time, such as analyzed data element(s) rolling 12 month period), occupancy (e.g., Occupied sqft/total inventory sqft, 100%−vacancy %, etc.), stock (e.g., inventory square footage (Office, Retail, Industrial) or units (Multifamily), revenue (e.g., revenue generated by renting out or otherwise using a piece of real estate), savings (e.g., tax savings, depreciation), costs (e.g., taxes, insurance, upkeep, payments to property managers, costs for findings tenants, property managers, etc.), geography and geographic location (e.g., views of water, distance to shopping, walking score, proximity to public transportation, distance to highways, proximity to job centers, proximity to local universities, etc.), building characteristics (e.g., date built, date renovated, etc.), property characteristics (e.g., address, city, state, zip, property type, unit type(s), number of units, numbers of bedrooms and bathrooms, square footage(s), lot size(s), assessed value(s), lot value(s), improvements value(s), etc.—possibly including current and past values), real estate markets characteristics (e.g., local year-over-year growth, historical year-over-year growth), broader economic information (e.g., gross domestic product growth, consumer sentiment, economic forecast data), local economic information (e.g., local economic growth, average local salaries and growth, etc.), local demographics (e.g., numbers of families, couples, single people, number of working-age people, numbers or percentage of people with at different education, salary, or savings levels, etc.). The techniques herein may be used to train a real estate computer-based reasoning model based on previous properties. Once the real estate computer-based reasoning system has been trained, then input properties may be analyzed using the real estate reasoning system. Using the techniques herein, the surprisal and/or conviction of the training data can be used to build an real estate computer-based reasoning system that balances the size of the computer-based reasoning model with the information that each additional property record (or set of records) provides to the model.

The techniques herein may be used to predict performance of real estate in the future. For example, based on the variables associated discussed here, that are related, e.g., with various geographies, property types, and markets, the techniques herein may be used to find property types and geographies with the highest expected value or return (e.g., as CAGR). As a more specific example, a model of historical CAGR with asking rent, capitalization rate, demand, net absorption, net completions, occupancy, stock, etc. can be trained. That model may be used, along with more current data, to predict the CAGR of various property types and/or geographies over the coming X years (e.g., 2, 3, 5, or 10 years). Such information may be useful for predicting future value for properties and/or automated decision making.

As another example, using the techniques herein, a batch of available properties may be given as input to the real estate computer-based reasoning systems, and the real estate computer-based reasoning system may be used to determine what properties are likely to be good investments. In some embodiments, the predictions of the computer-based reasoning system may be used to purchase properties. Further, as discussed extensively herein, explanations may be provided for the decisions. Those explanation may be used by a controllable system to make investment decisions and/or by a human operator to review the investment predictions.

In some embodiments, processes 100, 400 may include determining the surprisal and/or conviction of each input real estate data case (or multiple real estate data cases) with respect to the associated labels or of the aspects of the computer-based reasoning model. The surprisal and/or conviction for the one or more real estate data cases may be determined and a determination may be made whether to select or include the one or more real estate data cases in the real estate computer-based reasoning model based on the determined surprisal and/or conviction. While there are more sets of one or more real estate data cases to assess, the process may return to determine whether more real estate data case sets should be included or whether aspects should be included and/or changed in the model. Once there are no more training cases to consider, the process can turn to controlling predicting real estate investments information for possible use in purchasing real estate using the real estate computer-based reasoning.

In some embodiments, process 100 may determine (e.g., in response to a request) the search result (e.g., k nearest neighbors, most probable cases in gaussian process regression, etc.) in the computer-based reasoning model for use in the real estate computer-based reasoning model. Based on those search results, the process can cause 199 control of a real estate system, using, for example, process 400. For example, the training data elements are related to real estate, and the real estate computer-based reasoning model trained on that data will determined investment value(s) for real estate data cases (properties) under consideration. These investment values may be any appropriate value, such as CAGR, monthly income, resale value, income or resale value based on refurbishment or new development, net present value of one or more of the preceding, etc. In some embodiments, process 400 begins by receiving 410 a real estate computer-based reasoning model. The process proceeds by receiving 420 properties under consideration for labeling and/or predicting value(s) for the investment opportunity. The real estate computer-based reasoning model is then used to determine 430 values for the real estate under consideration. The prediction(s) for the real estate is (are) then made 440. If there are more 450 properties to consider, then the system returns to receive 410 data on those properties and otherwise ceases 460. In some embodiments, the real estate computer-based reasoning model may be used to determine which training properties are "closest" (or most similar) to the incoming property or property types and/or geographies predicted as high value. The investment value(s) for the properties under consideration may then be determined based on the "closest" properties or property types and/or geographies.

Cybersecurity

The processes 100, 400 may also be used for cybersecurity analysis. For example, a cybersecurity company or other organization may want to perform threat (or anomalous behavior) analysis, and in particular may want explanation data associated with the threat or anomalous behavior analysis (e.g., why was a particular event, user, etc. identified as a threat or not a threat?). The computer-based reasoning model may be trained using known threats/anomalous behavior and features associated with those threats or anomalous behavior. Data that represents neither a threat nor anomalous behavior (e.g., non-malicious access attempts, non-malicious emails, etc.) may also be used to train the computer-based reasoning model. In some embodiments, when a new entity, user, packet, payload, routing attempt, access attempt, log file, etc. is ready for assessment, the features associated with that new entity, user, packet, payload, routing attempt, access attempt, log file, etc. may be used as input in the trained cybersecurity computer-based reasoning system. The cybersecurity computer-based reasoning system may then determine the probability or likelihood that the entity, user, packet, payload, routing attempt, access attempt, pattern in the log file, etc. is or represents a threat or anomalous behavior. Further, explanation data, such as a conviction measures, training data used to make a decision etc., can be used to mitigate the threat or anomalous behavior and/or be provided to a human operator in order to further assess the potential threat or anomalous behavior.

Any type of cybersecurity threat or anomalous behavior can be analyzed and detected, such as denial of service (DoS), distributed DOS (DDoS), brute-force attacks (e.g., password breach attempts), compromised credentials, malware, insider threats, advanced persistent threats, phishing, spear phishing, etc. and/or anomalous traffic volume, bandwidth use, protocol use, behavior of individuals and/or accounts, logfile pattern, access or routing attempt, etc. In some embodiments the cybersecurity threat is mitigated (e.g., access is suspended, etc.) while the threat is escalated to a human operator. As a more specific example, if an email is received by the email server, the email may be provided as input to the trained cybersecurity computer-based reasoning model. The cybersecurity computer-based reasoning model may indicate that the email is a potential threat (e.g., detecting and then indicating that email includes a link to a universal resource locator that is different from the universal resource location displayed in the text of the email). In some embodiments, this email may be automatically deleted, may be quarantined, and/or flagged for review.

In some embodiments, processes 100, 400 may include determining (e.g., in response to a request) the surprisal and/or conviction of one or more data elements or aspects of the cybersecurity system. The surprisal or conviction for the one or more cybersecurity system data elements or aspects may be determined and a determination may be made whether to select or include the one or more cybersecurity system data elements or aspects in a cybersecurity system computer-based reasoning model based on the determined surprisal and/or conviction. While there are more sets of one or more cybersecurity system data elements or aspects to assess, the process may return to determine whether more cybersecurity system data elements or aspects should be included. Once there are no more cybersecurity system data elements or aspects to consider, the process can turn to controlling the cybersecurity computer-based reasoning system using the cybersecurity system computer-based reasoning model.

In some embodiments, process 100 may determine (e.g., in response to a request) the search result (e.g., k nearest neighbors, most probable cases in gaussian process regression, etc.) in the computer-based reasoning model for use in the cybersecurity system computer-based reasoning model. Based on those search results, the process can cause 199 control of a cybersecurity computer-based reasoning system using process 400. For example, if the data elements are related to cybersecurity system actions, then the cybersecurity system computer-based reasoning model trained on that data will control the cybersecurity system (e.g., quarantine, delete, or flag for review, entities, data, network traffic, etc.). Process 400 proceeds by receiving 410 a cybersecurity system computer-based reasoning model. The process proceeds by receiving 420 a context. The cybersecurity system computer-based reasoning model is then used to determine 430 an action to take. The action is then performed by the control system (e.g., caused by the cybersecurity system computer-based reasoning system). If there are more 450 contexts to consider, then the system returns to receive 410 those contexts and otherwise ceases 460. In such embodiments, the cybersecurity system computer-based reasoning model may be used to assess cybersecurity threats, etc. In some embodiments, the chosen action(s) are then performed by a control system.

Example Control Hierarchies

In some embodiments, the technique herein may use a control hierarchy to control systems and/or cause actions to be taken (e.g., as part of causing 199 control in FIG. 1). There are numerous example control hierarchies and many types of systems to control, and hierarchy for vehicle control is presented below. In some embodiments, only a portion of this control hierarchy is used. It is also possible to add levels to (or remove levels from) the control hierarchy.

An example control hierarchy for controlling a vehicle could be:
Primitive Layer—Active vehicle abilities (accelerate, decelerate), lateral, elevation, and orientation movements to control basic vehicle navigation
Behavior Layer—Programmed vehicle behaviors which prioritize received actions and directives and prioritize the behaviors in the action.
Unit Layer—Receives orders from command layer, issues moves/directives to the behavior layer.
Command Layers (hierarchical)—Receives orders and gives orders to elements under its command, which may be another command layer or unit layer.

Example Cases, Data Elements, Contexts, and Operational Situations

In some embodiments, the cases or data elements may include context data and action data in context-action pairs.

Further, cases may relate to control of a vehicle. For example, context data may include data related to the operation of the vehicle, including the environment in which it is operating, and the actions taken may be of any granularity. Consider an example of data collected while a driver, Alicia, drives around a city. The collected data could be context and action data where the actions taken can include high-level actions (e.g., drive to next intersection, exit the highway, take surface roads, etc.), mid-level actions (e.g., turn left, turn right, change lanes) and/or low-level actions (e.g., accelerate, decelerate, etc.). The contexts can include any information related to the vehicle (e.g. time until impact with closest object(s), speed, course heading, breaking distances, vehicle weight, etc.), the driver (pupillary dilation, heart rate, attentiveness, hand position, foot position, etc.), the environment (speed limit and other local rules of the road, weather, visibility, road surface information, both transient such as moisture level as well as more permanent, such as pavement levelness, existence of potholes, etc.), traffic (congestion, time to a waypoint, time to destination, availability of alternate routes, etc.), and the like. These input data (e.g., context-action pairs for training a context-based reasoning system or input training contexts with outcome actions for training a machine learning system) can be saved and later used to help control a compatible vehicle in a compatible operational situation. The operational situation of the vehicle may include any relevant data related to the operation of the vehicle. In some embodiments, the operational situation may relate to operation of vehicles by particular individuals, in particular geographies, at particular times, and in particular conditions. For example, the operational situation may refer to a particular driver (e.g., Alicia or Carole). Alicia may be considered a cautious car driver, and Carole a faster driver. As noted above, and in particular, when approaching a stop sign, Carole may coast in and then brake at the last moment, while Alicia may slow down earlier and roll in. As another example of an operational situation, Bob may be considered the "best pilot" for a fleet of helicopters, and therefore his context and actions may be used for controlling self-flying helicopters.

In some embodiments, the operational situation may relate to the locale in which the vehicle is operating. The locale may be a geographic area of any size or type, and may be determined by systems that utilize machine learning. For example, an operational situation may be "highway driving" while another is "side street driving". An operational situation may be related to an area, neighborhood, city, region, state, country, etc. For example, one operational situation may relate to driving in Raleigh, N.C. and another may be driving in Pittsburgh, Pa. An operational situation may relate to safe or legal driving speeds. For example, one operational situation may be related to roads with forty-five miles per hour speed limits, and another may relate to turns with a recommended speed of 20 miles per hour. The operational situation may also include aspects of the environment such as road congestion, weather or road conditions, time of day, etc. The operational situation may also include passenger information, such as whether to hurry (e.g., drive faster), whether to drive smoothly, technique for approaching stop signs, red lights, other objects, what relative velocity to take turns, etc. The operational situation may also include cargo information, such as weight, hazardousness, value, fragility of the cargo, temperature sensitivity, handling instructions, etc.

In some embodiments, the context and action may include vehicle maintenance information. The context may include information for timing and/or wear-related information for individual or sets of components. For example, the context may include information on the timing and distance since the last change of each fluid, each belt, each tire (and possibly when each was rotated), the electrical system, interior and exterior materials (such as exterior paint, interior cushions, passenger entertainment systems, etc.), communication systems, sensors (such as speed sensors, tire pressure monitors, fuel gauges, compasses, global positioning systems (GPS), RADARs, LiDARs, cameras, barometers, thermal sensors, accelerometers, strain gauges, noise/sound measurement systems, etc.), the engine(s), structural components of the vehicle (wings, blades, struts, shocks, frame, hull, etc.), and the like. The action taken may include inspection, preventative maintenance, and/or a failure of any of these components. As discussed elsewhere herein, having context and actions related to maintenance may allow the techniques to predict when issues will occur with future vehicles and/or suggest maintenance. For example, the context of an automobile may include the distance traveled since the timing belt was last replaced. The action associated with the context may include inspection, preventative replacement, and/or failure of the timing belt. Further, as described elsewhere herein, the contexts and actions may be collected for multiple operators and/or vehicles. As such, the timing of inspection, preventative maintenance and/or failure for multiple automobiles may be determined and later used for predictions and messaging.

Causing performance of an identified action can include sending a signal to a real car, to a simulator of a car, to a system or device in communication with either, etc. Further, the action to be caused can be simulated/predicted without showing graphics, etc. For example, the techniques might cause performance of actions in the manner that includes, determining what action would be take, and determining whether that result would be anomalous, and performing the techniques herein based on the determination that such state would be anomalous based on that determination, all without actually generating the graphics and other characteristics needed for displaying the results needed in a graphical simulator (e.g., a graphical simulator might be similar to a computer game).

Example of Certainty and Conviction

In some embodiments, certainty score is a broad term encompassing it plain and ordinary meaning, including the certainty (e.g., as a certainty function) that a particular set of data fits a model, the confidence that a particular set of data conforms to the model, or the importance of a feature or case with regard to the model. Determining a certainty score for a particular case can be accomplished by removing the particular case from the case-based or computer-based reasoning model and determining the conviction score of the particular case based on an entropy measure associated with adding that particular case back into the model. Any appropriate entropy measure, variance, confidence, and/or related method can be used for making this determination, such as the ones described herein. In some embodiments, certainty or conviction is determined by the expected information gain of adding the case to the model divided by the actual information gain of adding the case. For example, in some embodiments, certainty or conviction may be determined based on Shannon Entropy, Rényi entropy, Hartley entropy, min entropy, Collision entropy, Rényi divergence, diversity index, Simpson index, Gini coefficient, Kullback-Leibler divergence, Fisher information, Jensen-Shannon divergence, Symmetrised divergence. In some embodiments, certainty scores are conviction scores and are determined by calculating the entropy, comparing the ratio of entropies, and/or the like.

In some embodiments, the conviction of a case may be computed based on looking only at the K nearest neighbors when adding the feature back into the model. The K nearest neighbors can be determined using any appropriate distance measure, including use of Euclidean distance, 1-Kronecker delta, Minkowski distance, Damerau-Levenshtein distance, and/or any other distance measure, metric, pseudometric, premetric, index, or the like. In some embodiments, influence functions are used to determine the importance of a feature or case.

In some embodiments, determining certainty or conviction scores can include determining the conviction of each feature of multiple features of the cases in the computer-based reasoning model. In this context the word "feature" is being used to describe a data field as across all or some of the cases in the computer-based reasoning model. The word "field," in this context, is being used to describe the value of an individual case for a particular feature. For example, a feature for a theoretical computer-based reasoning model for self-driving cars may be "speed". The field value for a particular case for the feature of speed may be the actual speed, such as thirty five miles per hour.

Returning to determining certainty or conviction scores, in some embodiments, determining the conviction of a feature may be accomplished by removing the feature from the computer-based reasoning model and determining a conviction score of the feature based on an entropy measure associated with adding the feature back into the computer-based reasoning model. For example, returning to the example above, removing a speed feature from a self-driving car computer-based reasoning model could include removing all of the speed values (e.g., fields) from cases from the computer-based reasoning model and determining the conviction of adding speed back into the computer-based reasoning model. The entropy measure used to determine the conviction score for the feature can be any appropriate entropy measure, such as those discussed herein. In some embodiments, the conviction of a feature may also be computed based on looking only at the K nearest neighbors when adding the feature back into the model. In some embodiments, the feature is not actually removed, but only temporarily excluded.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
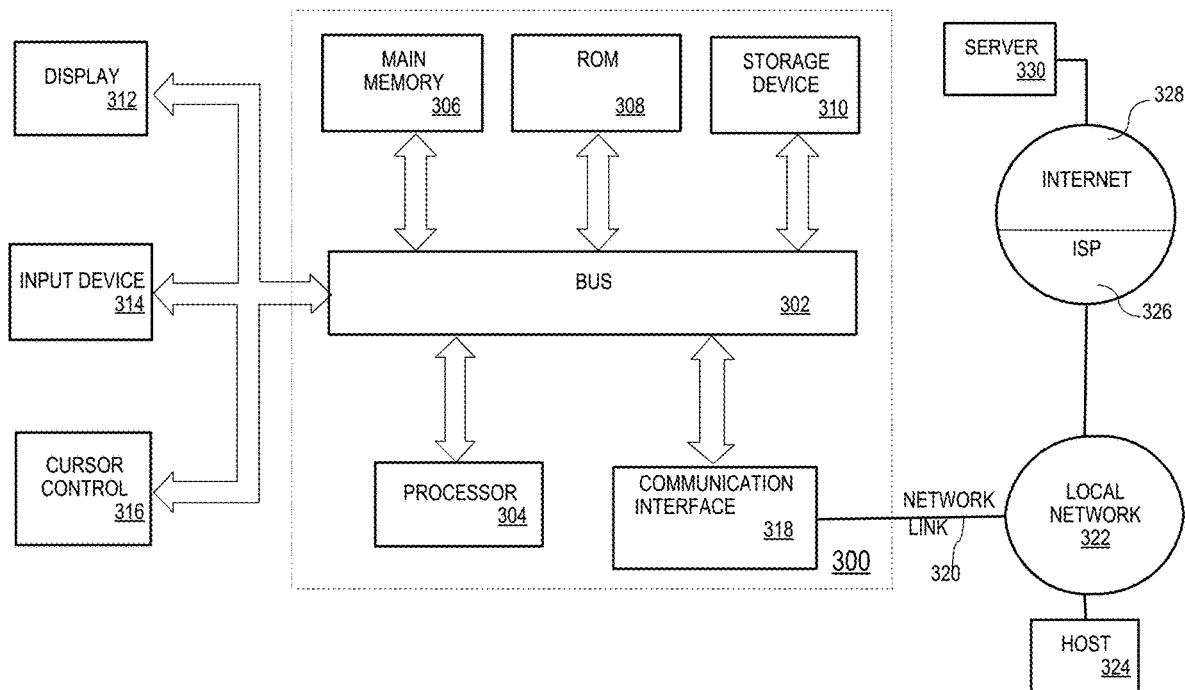
FIG. 3 is a block diagram of example hardware for explainable and automated decisions in computer-based reasoning systems.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as an OLED, LED or cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. The input device 314 may also have multiple input modalities, such as multiple 2-axes controllers, and/or input buttons or keyboard. This allows a user to input along more than two dimensions simultaneously and/or control the input of more than one type of action.

Computer system 300 may implement the techniques described herein using customized hard-wired logic, one or more ASICs or FPGAs, firmware and/or program logic which in combination with the computer system causes or programs computer system 300 to be a special-purpose machine. According to some embodiments, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving a request for a suggested action based on an input context, in a computer-based reasoning system, wherein the computer-based reasoning system includes a computer-based reasoning model;
    determining one or more candidate cases based on the input context in the computer-based reasoning system, wherein the one or more candidate cases include respective one or more candidate actions;
    determining the suggested action based on the respective one or more candidate actions;
    determining a suggested cluster based on the one or more candidate cases,
    determining a compatibility score for the suggested action and the suggested cluster based at least in part on the suggested cluster and the suggested action;
    determining a certainty score for the suggested cluster, and
    when the compatibility score is not beyond a threshold or the certainty score is not beyond a second threshold, responding to the request for the suggested action with the suggested action, the suggested cluster, and the certainty score for the suggested cluster;
    when the compatibility score corresponds is beyond the threshold and the certainty score is beyond the second threshold:
        causing the performance of the suggested action by a control system,
    wherein determining the certainty score for the suggested cluster comprises determining the certainty score is based on a conviction function associated with:
        removing a suggested case associated with the suggested cluster from the computer-based reasoning model;
        adding the suggested case into the computer-based reasoning model,
    wherein the conviction function is a measure of how much information the suggested case distorts the computer-based reasoning model,
    wherein the method is performed by one or more computing devices.

2. The method of claim 1, wherein determining the compatibility score for the suggested action and the suggested cluster comprises determining whether there is a known compatibility between the suggested action and the suggested cluster based on a compatibility lookup of the suggested action and the suggested cluster.

3. The method of claim 1, wherein determining the compatibility score for the suggested action and the suggested cluster comprises determining whether there is a known incompatibility between the suggested action and the suggested cluster based on an incompatibility lookup of the suggested action and the suggested cluster.

4. The method of claim 1, wherein the compatibility score for the suggested action and the suggested cluster represents a likelihood of fit between an action and a cluster.

5. The method of claim 1, wherein the compatibility score for the suggested action and the suggested cluster represents a probability of fit between an action and a cluster.

6. A system for performing a machine-executed operation involving instructions, wherein said instructions are instructions which, when executed by one or more computing devices, cause performance of a process comprising:
receiving a request for a suggested action based on an input context, in a computer-based reasoning system, wherein the computer-based reasoning system includes a computer-based reasoning model;
determining one or more candidate cases based on the input context in the computer-based reasoning system, wherein the one or more candidate cases include respective one or more candidate actions;
determining the suggested action based on the respective one or more candidate actions;
determining a certainty score based on the suggested action, wherein the certainty score is determined based on a conviction function associated with:
removing a suggested case associated with the suggested action from the computer-based reasoning model;
adding the suggested case into the computer-based reasoning model,
wherein the conviction function is a measure of how much information the suggested case distorts the computer-based reasoning model;
when the certainty score is beyond a certain threshold, causing control of a controllable system based on the suggested action;
when the certainty score is not beyond the certain threshold:
determining one or more explanation factors for the suggested action determined based at least in part on the input context;
responding to the request for the suggested action with the suggested action and the one or more explanation factors,
wherein determining the suggested action comprises determining a cluster associated with each of the one or more candidate cases, determining a suggested cluster based on the cluster associated with each of the one or more candidate cases, and the suggested cluster is returned as the suggested action.

7. The system of claim 6, wherein determining the suggested action comprises determining the cluster associated with each of the one or more candidate cases, determining the suggested cluster based on the cluster associated with each of the one or more candidate cases, and determining the suggested action based at least in part based on the suggested cluster.

8. The system of claim 6, wherein determining the suggested action comprises:
determining a weighting for each action of the respective one or more candidate actions based on a function of a distance between the input context and each of the one or more candidate cases;
determining the suggested action based on the weighting for each action of the respective one or more candidate actions.

9. The system of claim 6, wherein responding to the request for the suggested action with at least the suggested action comprises when the certainty score is beyond the certain threshold, comprises responding to the request for the suggested action with at least the suggested action and the certainty score when the certainty score is beyond the certain threshold.

10. A system for performing a machine-executed operation involving instructions, wherein said instructions are instructions which, when executed by one or more computing devices, cause performance of a process comprising:
receiving a request for a suggested action based on an input context, in a computer-based reasoning system, wherein the computer-based reasoning system includes a computer-based reasoning model;
determining one or more candidate cases based on the input context in the computer-based reasoning system, wherein the one or more candidate cases include respective one or more candidate actions;
determining the suggested action based on the respective one or more candidate actions;
determining a certainty score based on the suggested action, wherein the certainty score is determined based on a conviction function associated with:
removing a suggested case associated with the suggested action from the computer-based reasoning model; and
adding the suggested case into the computer-based reasoning model,
wherein the conviction function is a measure of how much information is required to describe a position of the suggested case relative to existing cases in the computer-based reasoning model;
when the certainty score is beyond a certain threshold, causing control of a controllable system based on the suggested action;
when the certainty score is not beyond the certain threshold:
determining one or more explanation factors for the suggested action determined based at least in part on the input context;
responding to the request for the suggested action with the suggested action and the one or more explanation factors,
wherein determining the suggested action comprises determining a cluster associated with each of the one or more candidate cases, determining a suggested cluster based on the cluster associated with each of the one or more candidate cases, and the suggested cluster is returned as the suggested action.

11. The system of claim 10, wherein determining the suggested action comprises determining the cluster associated with each of the one or more candidate cases, determining the suggested cluster based on the cluster associated with each of the one or more candidate cases, and determining the suggested action based at least in part based on the suggested cluster.

12. The system of claim 10, wherein determining the suggested action comprises:
determining a weighting for each action of the respective one or more candidate actions based on a function of a distance between the input context and each of the one or more candidate cases;
determining the suggested action based on the weighting for each action of the respective one or more candidate actions.

13. The system of claim 10, wherein responding to the request for the suggested action with at least the suggested action comprises when the certainty score is beyond a certain threshold, comprises responding to the request for the suggested action with at least the suggested action and the certainty score when the certainty score is beyond the certain threshold.

\* \* \* \* \*